(12) United States Patent
Kim et al.

(10) Patent No.: US 9,531,601 B2
(45) Date of Patent: Dec. 27, 2016

(54) MODULAR INTERFACE FRAMEWORK FOR NETWORK DEVICES

(71) Applicant: Belkin International, Inc., Playa Vista, CA (US)

(72) Inventors: Ryan Yong Kim, Rolling Hills Estates, CA (US); Venkata Subba Rao Pathuri, Alpharetta, GA (US)

(73) Assignee: BELKIN INTERNATIONAL INC., Playa Vista, CA (US)

( * ) Notice: Subject to any disclaimer, the term of this patent is extended or adjusted under 35 U.S.C. 154(b) by 277 days.

(21) Appl. No.: 14/254,689

(22) Filed: Apr. 16, 2014

(65) Prior Publication Data

US 2015/0304157 A1 Oct. 22, 2015

(51) Int. Cl.
  *G06F 15/16* (2006.01)
  *H04L 12/24* (2006.01)
  *G06F 3/0482* (2013.01)
  *H04L 29/08* (2006.01)

(52) U.S. Cl.
  CPC .............. *H04L 41/22* (2013.01); *G06F 3/0482* (2013.01); *H04L 67/125* (2013.01); *H04L 41/082* (2013.01)

(58) Field of Classification Search
  CPC ....................................................... H04L 67/34
  USPC ................................. 709/220, 221, 223, 227
  See application file for complete search history.

(56) References Cited

U.S. PATENT DOCUMENTS

| | | | | |
|---|---|---|---|---|
| 7,707,606 | B2* | 4/2010 | Hofrichter et al. | 725/50 |
| 7,743,012 | B2* | 6/2010 | Chambers et al. | 709/203 |
| 7,937,484 | B2* | 5/2011 | Julia et al. | 709/231 |
| 8,855,793 | B2* | 10/2014 | Bhargava | H04Q 9/00 700/14 |
| 2012/0116820 | A1* | 5/2012 | English et al. | 705/4 |
| 2012/0210268 | A1* | 8/2012 | Hilbrink | G06F 3/0484 715/773 |
| 2012/0278454 | A1* | 11/2012 | Stewart et al. | 709/220 |
| 2012/0310416 | A1* | 12/2012 | Tepper et al. | 700/276 |
| 2013/0188097 | A1* | 7/2013 | Smith | H04N 5/00 348/720 |
| 2016/0147207 | A1* | 5/2016 | Park | G08C 17/00 700/275 |

OTHER PUBLICATIONS

SmartThings, "Easy & Affordable Smart Home Automation" retrieved from http://www.smartthings.com on Jun. 19, 2014, 5 pages.
SmartThings Product, retrieved from http://www.smartthings.com/product/ on Jun. 19, 2014, 9 pages.
(Continued)

*Primary Examiner* — Douglas Blair
(74) *Attorney, Agent, or Firm* — Kilpatrick Townsend & Stockton LLP

(57) ABSTRACT

Techniques for providing interface modules for controlling network devices are provided. For example, a method may include receiving, at a computing device, a communication including a unique identifier for a network device connected to a network. The method may further include using the unique identifier to determine an interface module for the network device and transmitting the interface module, wherein when the interface module is received, the interface module displays one or more interface elements usable to control the network device connected to the network.

23 Claims, 13 Drawing Sheets

(56) References Cited

OTHER PUBLICATIONS

SmartThings Hub, retrieved from https://shop.smartthings.com/#!/products/smartthings-hub on Jun. 19, 2014, 16 pages.
SmartThings GE Light & Appliance Plug-and-Control Power Outlet, retrieved from https://shop.smartthings.com/#!/products/ge-z-wave-wireless-lighting-control-lamp-module on Jun. 19, 2014, 14 pages.
Quirky, "Shop for products invented by real people" retrieved from http://www.quirky.com on Jul. 2, 2014, 1 page.
Quirky Pivot Power Genius, retrieved from http://www.quirky.com/shop/633-pivot-power-genius-power-control-from-your-smartphone on Jul. 2, 2014, 6 pages.
Quirky Spotter, retrieved from http://www.quirky.com/shop/609-spotter-multi-purpose-sensor on Jul. 2, 2014, 4 pages.
Electric Imp, "Connectivity Made Simple" retrieved from http://electricimp.com/ on Jun. 19, 2014, 2 pages.
Electric Imp Product, retrieved from http://electricimp.com/product/ on Jun. 19, 2014, 3 pages.
Electric Imp, "The Interactive imp: how to manage communication between app, agent and device" retrieved from http://electricimp.com/docs/resources/interactive/ on Jun. 19, 2014, 11 pages.
Electric Imp Lockitron, retrieved from http://electricimp.com/productgallery/lockitron/ on Jun. 19, 2014, 2 pages.
Electric Imp. "How to run an imp offline: Making- and breaking-Internet connections" retrieved from http://electricimp.com/docs/resources/offline/ on Jun. 19, 2014, 9 pages.
Electric Imp, Inc. "specification: imp001 version 20140226" http://www.electricimp.com/ (2014) 14 pages.
Electric Imp, Inc. "specification: imp002 version 20140226" http://www.electricimp.com/ (2014) 18 pages.
Murata Manufacturing Co., Ltd. "WiFi Module Data Sheet, Broadcom WiFi + ST Micro STM32F405 MCU, Tentative P/N: LBWA1ZV1CD-716" http://electricimp.com/docs/attachments/hardware/datasheets/imp003_LBWA1ZV1CD_060314.pdf Jun. 3, 2014, 24 pages.
Crock-Pot, "Coming Soon! Crockpot® Smart Slow Cooker enabled with WeMo™" retrieved from http://www.crock-pot.com/slow-cookers/coming-soon%21-crock-pot%C2%AE-smart-slow-cooker-enabled-with-wemo%E2%84%A2/SCCPWM600-V1.html on Apr. 14, 2014, 6 pages.

* cited by examiner

MODULAR INTERFACE FRAMEWORK FOR NETWORK DEVICES

TECHNICAL FIELD

The present disclosure relates to an interface framework for network devices. Specifically, various techniques and systems are provided for distributing visual interface modules for monitoring and controlling network devices in a wireless network.

BACKGROUND

Multiple network devices may be present within a local area network. For example, network devices that provide various functionalities may be present within the local area network. For example, a home automation network device may provide a user with the ability to remotely configure or control one or more appliances within the user's home. Each network device within the local area network may have different capabilities and functionalities. Accordingly, multiple network devices having different capabilities may be associated with a local area network. A user may only be able to control certain types of network devices using an application with a user interface designed to control those types of network devices. Thus, the existence of multiple network devices within a local area network may require a user to obtain multiple applications and/or updated application versions in order to control all of the network devices within the local area network.

SUMMARY

Techniques are described for dynamically providing interface modules for controlling network devices within wireless and wired networks. In some examples, a server may determine that an interface module exists for a network device connected to a home local area network. In one example, the interface module can be a visual interface module. In other examples, wearable devices, ambient sensors, and other control interfaces can have dynamically detected and updated interface control capabilities and can be used to control network devices. Such wearable devices or ambient sensors and interfaces can use interface modules, but may not have visual interfaces. Thus, the interface modules described herein can be part of visual and non-visual interfaces. The network device may be a newly discovered network device. The server may provide the interface module to an application installed on a mobile device so that the mobile device can monitor and control the network device using the application. The server can also provide the interface module to an application installed on a stationary device such as, for example, a network gateway, a personal computer, a connected television (i.e., a smart TV), or a touchscreen device mounted on a wall or other surface (i.e., a touchscreen integrated into the door of a refrigerator or another appliance), so that the application can be used to monitor and control the network device. For example, a home local area network may include a gateway connected to a discovered network device. The server may determine that an interface module exists for the network device, and thus that the interface module needs to be provided to the gateway and/or a mobile device associated with the network device. For example, the server may determine the existence of multiple interface modules corresponding to respective network devices based on communications from the network devices and/or communication from a mobile device that is associated with the network devices. Upon discovering a network device that is connected to a home local area network, the server may determine a unique ID for the network device and use the unique ID to identify an existing interface module for the network device.

In certain embodiments, the interface module may have a unique interface identifier assigned to it. For example, the interface module may have been previously uploaded to the server, added to an interface registry, and assigned a unique interface ID. According to these embodiments, the interface module is designed for controlling and/or monitoring the network device. For example, the interface module may be a modular tile for the network device that was previously created, registered, uniquely identified, and uploaded to a tile registration and discovery service hosted on the server. The server may then transmit the uniquely identified interface module to a mobile device associated with the home local area network. Once received by the mobile device, the interface module may display interactive interface elements usable to control the network device. For example, the interface module may be executable within an application installed on mobile device and the interface elements may include interactive elements for controlling the network device. Accordingly, an interface module for a newly discovered network device may be identified and transmitted to a mobile device so that the mobile device can be used to control the network device, regardless of whether the mobile device has previously been connected to or associated with the network device.

In some examples, network devices may send respective communications to a server indicating that they are connected to a local area network. For example, a first network device may send a first unique identifier and a second network device may send a second unique identifier to the server. The server can use the unique identifiers to determine respective interface modules corresponding to each of network devices. A mobile device may subsequently discover the first and second network devices, retrieve their unique identifiers, and then use the unique identifiers to retrieve visual interface modules from the server, the interface modules having been designed for controlling the network devices. In an example, the interface modules can be tiles based on standardized design templates. For instance, the tiles can be developed in accordance with the design templates, uniquely identified, and uploaded to the server. In one example, the server can host a cloud-based tile registration and discovery service and the tiles can be uploaded to the service by tile creators and developers.

According to at least one example, a computer-implemented method may be provided that includes receiving, at a computing device, a communication including a unique identifier for a network device connected to a network. The method may further include using the unique identifier to determine an interface module for the network device and transmitting the interface module, wherein when the interface module is received, the interface module displays one or more interface elements usable to control the network device connected to the network.

In some embodiments, a system may be provided that includes one or more data processors. The system may further include a memory having instructions stored thereon, which when executed by the one or more data processors, cause the computing device to perform operations including: receiving a communication including a unique identifier for a network device connected to a network; using the unique identifier to determine an interface module for the network device; and transmitting the interface module, wherein when the interface module is received, the interface module displays one or more interface elements usable to control the network device connected to the network.

In other embodiments, a computer-program product may be provided. The computer-program product may be tangibly embodied in a non-transitory machine-readable storage medium. The machine-readable storage medium may include instructions configured to cause a data processing apparatus to: receive a communication, wherein the communication includes an indication that a first network identifier and a second network identifier are associated with a plurality of network devices in a network; determine a common network identifier for use with the plurality of network devices in the network; and transmit the common network identifier to one or more of the plurality of network devices.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures.

DETAILED DESCRIPTION

Figure 1:
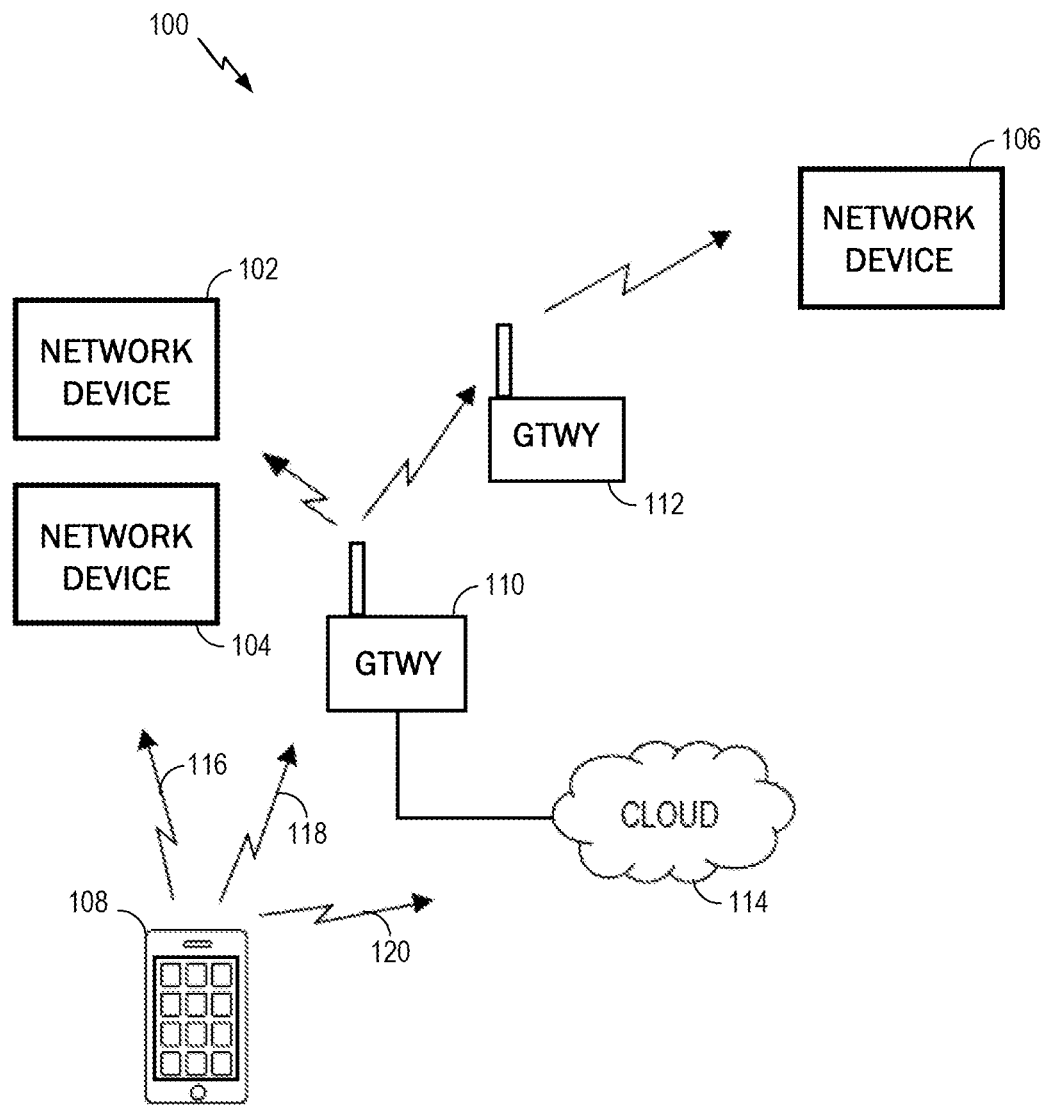
FIG. 1 is an illustration of an example of a wireless network environment, in accordance with some embodiments.

The present disclosure relates to a framework for providing visual interfaces for controlling network devices. A computing device, such as a mobile device, can receive and execute visual interface modules to monitor and control network devices without having to upgrade or reinstall an application each time a new network device is discovered.

A local area network, such as a user's home local area network, can include multiple network devices that provide various functionalities. For example, a home automation network device may provide a user with the ability to remotely configure or control one or more appliances within the user's home. Network devices may be accessed and controlled by mobile devices and/or network gateways. The local area network can also extend outside the user's home and include network devices located outside the user's home. For instance, the local area network can include network devices such as exterior motion sensors, exterior lighting (i.e., porch lights, walkway lights, security lights, and the like), garage door openers, sprinkler systems, and other network devices that are exterior to the user's dwelling. When a mobile device accesses the network, the mobile device may wish to receive visual interfaces appropriate for controlling network devices accessible on the local area network. In some embodiments, a process for determining and obtaining visual interfaces of network devices on the local area network can be facilitated by a cloud based service.

In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to, portable or non-portable storage devices, optical storage devices, wireless channels, and various other mediums capable of storing, containing or carrying instruction(s) and/or data. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

A local area network may be set up to provide a user with access to various devices within the network. For example, a home automation network may include one or more network devices that provide a user with the ability to remotely configure or control one or more appliances within the user's home. The local area network may include one or more gateways that provide the user with access to the network devices. The one or more gateways may also provide the user and the network devices with access to one or more external networks, such as a cloud network, the Internet, and/or other wide area networks.

It is desirable for a user to be able to monitor and control the network devices (e.g., using a mobile device) while located within the local area network and also while located remotely from the local area network. As explained herein, a local area network may include multiple network devices. In some embodiments, a user may create an account with login information that is used to authenticate the user and allow access to the network devices. For example, once an account is created, a user may enter the login information in order to access a network device in a network. In some embodiments, a modular visual interface framework may be utilized to dynamically and implicitly provide visual interface modules to a mobile device so that the mobile device can be used to control network devices within a network without having to install a new application or a version of an application for each network device. The user interface modules, when executed by an application, can render a tile including an icon, a name for a network device, and one or more interactive elements corresponding to one or more primary functions of the network device. For example, the one or more user interface elements can include a user interface element selectable to turn the network device on and off.

In some embodiments, an accountless authentication process may be performed so that the user can access and control one or more network devices within a network without having to enter network device login credentials each time access is requested. While located locally within the local area network, the mobile device may be authenticated based on the mobile device's authentication with the local area network. For example, if the mobile device has authorized access to the local area network (e.g., a WiFi network provided by a gateway), the network devices paired with that local area network may allow the mobile device to connect to them without requiring a login. Accordingly, only users of mobile devices that have authorization to access the local area network are authorized to access network devices within the local area network, and these users are authorized without having to provide login credentials for the network devices.

While remote, the user may access the network devices using an external network, such as a cloud network and/or the Internet. An accountless authentication process may also be performed when the user is remote so that the user can access network devices within the network without having to enter network device login credentials. For example, a cloud network server may provide a network ID and/or one or more keys to a network device and to a mobile device (e.g., running an application, program, or the like). In some cases, a unique key may be generated for the network device and a separate unique key may be generated for the mobile device. The keys may be specifically encrypted with unique information identifiable only to the network device and the mobile device. The network device and the mobile device may be authenticated using the network ID and/or each device's corresponding key each time the network device or mobile device attempts to access the cloud network server.

In one example, a home wireless local area network may include a single gateway, such as a router. A network device within the local area network may pair with or connect to the gateway and may obtain credentials from the gateway. For example, when the network device is powered on, a list of gateways that are detected by the network device may be displayed on a mobile device (e.g., via an application, program, or the like installed on and executed by the mobile device). In this example, only the single gateway is included in the home local area network (e.g., any other displayed gateways may be part of other local area networks). In some embodiments, only the single gateway may be displayed (e.g., when only the single gateway is detected by the network device). A user may select the single gateway as the gateway with which the network device is to pair and may enter login information for accessing the gateway. The login information may be the same information that was originally set up for accessing the gateway. The mobile device may send the login information to the network device and the network device may use the login information to pair with the gateway. The network device may then obtain the credentials from the gateway. The credentials may include a service set identification (SSID) of the home local area network, a media access control (MAC) address of the gateway, and/or the like. The network device may transmit the credentials to a server, such as a cloud network server. In some embodiments, the network device may also send information relating to the network device (e.g., MAC address, serial number, or the like) and/or information relating to the mobile device (e.g., MAC address, serial number, application unique identifier, or the like).

The cloud network server may register the gateway as a network and may assign the network a network identifier (ID). The cloud network server may further generate a set of security keys, which may include one or more security keys. For example, the server may generate a unique key for the network device and a separate unique key for the mobile device. The server may associate the network device and the mobile device with the network by storing a network ID and the set of security keys in a record or profile. The cloud network server may then transmit the network ID and the set of security keys to the network device. The network device may store the network ID and its unique security key. The network device may also send the network ID and the mobile device's unique security key to the mobile device. The network device and the mobile device may then communicate with the cloud server using the network ID and the unique key generated for each device. Accordingly, the user may remotely access the network device via the cloud network without logging in each time access is requested. Also, the network device can exchange communications with the server regarding the network.

In some embodiments, a local area network may include multiple network devices. For example, a local area network may include a gateway paired with a first network device and a second network device. A server (e.g., a cloud network server) may register the first and second network devices as a network with a network ID and may receive unique identifiers for the first and second network devices and a mobile device. The set of security keys may include a unique security key for the first network device, a unique security key for the second network device, and a unique security key for the mobile device for use in accessing the first and second network devices on the network. The server may associate the first network device, the second network device, and the mobile device with the network by storing the network ID and the set of security keys in a record or profile. The server may also associate the first network device with a first visual interface module by storing a first interface module ID in a data store of interface modules, and associate the second network device with a second visual interface module by storing a second interface module ID in the data store of interface modules. The server may then transmit the network ID, the set of security keys, and the first interface module ID to the first network device, and may transmit the network ID and the set of security keys and the second interface module ID to the second network device. The two network devices may store the network ID, the set of security keys, and the respective interface module ID of the visual interface module with which each network device is associated. Each network device may send the respective interface module ID and the mobile device's unique security key to the mobile device. The network devices and the mobile device may then communicate with the cloud server using the network ID and the unique key generated for each device. Additionally, the cloud server can store and provide respective visual interface modules corresponding to each of the network devices to the mobile device. Accordingly, when multiple network devices are included in the home local area network, multiple modular tiles associated with different types of network devices may be provided within the framework. When the mobile device is located within range of a gateway in the local area network, there is no problem accessing the network devices and information provided by the network devices due to the ability of the mobile device to perform local discovery techniques (e.g., universal plug and play (UPnP)). However, when the user is located remotely from the local area network, the mobile device may only be associated with network devices that were previously discovered, which prevents the mobile device from accessing or controlling newly discovered network devices within the local area network. Accordingly, techniques and systems are described herein for providing interface modules for controlling network devices using a visual interface of an application installed on a mobile device associated with a wireless network. The techniques and systems can use a framework for registering and distributing uniquely identified interface modules. The framework can include a cloud-based interface module registration and discovery service.

In certain embodiments, an application installed on a mobile device has a graphical interface, and the application is configured to execute visual interface modules usable to control respective network devices in a local area network. For example, the mobile device can be configured to dynamically discover network devices within the network, obtain visual interface modules corresponding to discovered network devices, and display, within the graphical interface, interactive elements appropriate for controlling the discovered network devices. In some embodiments, a framework provides a visual interface module that is specific to a given network device. For example, the visual interface module can be a modular tile displayable within an application, wherein the tile includes information identifying a network device and interactive elements for controlling the network device on a network. According to some embodiments, the modular tile can be displayed by an application installed on a mobile device and/or within a web browser interface of a network gateway. A modular tile for a given network device can be developed by a manufacturer of the network device and/or a third party developer. The modular tile can then be uniquely identified and uploaded to a server (e.g., a cloud network server) so that when that network device is subsequently discovered to be on a network, the server can provide the modular tile to a device, such as a mobile device, used to control the network device. According to embodiments, modular tiles for newly discovered network devices are identified and transmitted to a mobile device.

In some embodiments, a modular tile framework is provided for displaying a visual interface including a navigable list of tiles, each tile representing one discovered, controllable network device. For instance, the navigable list can be a scrollable table of modular tiles with each tile including a collection of independent user interface elements for monitoring and/or controlling aspects of a respective discovered network device. In some embodiments, each tile has an icon representing a network device, a name of the device, and one or more interactive interface elements for interactively controlling and/or monitoring the device. In certain embodiments, tiles can include textual and/or graphical elements that convey state or status information for a network device. According to an embodiment, each tile has a consistent look and feel with respect to other tiles rendered within a sortable list of network devices by an application used to control the devices. For example, each tile within the framework can have a similar layout with icons having substantially the same sizes, text such as device names having similar font types and sizes, and similar color schemes or palettes. Depending on the properties and functionalities of a network device being controlled, a tile for the network device can include one or more interactive interface elements usable to control a primary functionality of the device. For example, a tile may include a button, a toggle switch, a dial, and/or a slider element that can be selected in order to control primary functions such as turning a network device on and off. In certain embodiments, the status or state of a network device can be indicated within the tile with text and/or graphically. For instance, coloring or shading of an interactive element, such as a power button element, can indicate whether a network device is connected to the network, powered off, on, restarting, or in a standby, sleep or hibernation mode. In accordance with these examples, part of a power button interface element in the tile can be shaded green when the device is powered on, red or un-shaded when the device is off, and pulsating and/or yellow when the device is in a transitional state. Examples of devices in transitional states include devices that are booting up, restarting, connecting to a network, or re-connecting to the network. In additional or alternative embodiments, the state of a network device can be conveyed by text displayed within a modular visual interface. For example, for a sensor device, text indicating the time and sensor-specific type of the most-recent activity detected (i.e., motion, temperature, sound, presence of a gas, or presence of a liquid) can be indicated as a text message within a tile.

In some embodiments, tiles within the modular tile framework can include menus or drawers. The menus can include a contextual menu relating to a primary level functionality of a network device. For instance, a tile associated with device having one or more secondary functionalities can include a sub-menu for selecting settings for such functionalities. For example, a tile can include a small drawer that displays options for secondary functionalities in response to a selection made for a primary functionality for a network device. In certain embodiments, small drawers can display secondary settings, including a default, implied secondary setting for a network device, wherein the implied secondary setting is tied to a setting selected for a primary function. For instance, if a network device having secondary operational modes is turned on via selection of an interactive element in its tile, an otherwise hidden drawer can be temporarily displayed with a default secondary setting and interactive elements for selecting the other secondary settings. Due to its normally hidden property and temporary, context-specific exposure, such a drawer can be conceptualized as a 'peekaboo' drawer.

A peekaboo drawer is so-named because it is usually hidden from view, but momentarily displayed in response to a selection of a primary functionality setting. For example, a peekaboo drawer for a space heater or air conditioner device, may have secondary settings of low, eco, medium and high and a default setting of eco. Such a drawer can be temporarily displayed when the space heater or air conditioner device is turned on so that one of the secondary settings can be selected. By using such peekaboo drawers, an application can convey a clean and simple interface for a list of tiles interface. Displaying secondary controls for each tile without the use of peekaboo drawers can unnecessarily clutter the interface with secondary controls that may not be necessary or relevant until such controls are needed. By implementing such peekaboo drawers, embodiments present a cleaner visual presentation for controls and functionalities that are not accessed or relevant all the time. For example, peekaboo drawers enable an application to present secondary controls that are relevant to a current context and/or a currently selected primary control.

In some embodiments, tiles within the modular tile framework that are associated with a network device having one or more tertiary or extended functionalities can include full menus for selecting settings for such functionalities. The full menus can be drop down menus or drawers including interactive elements for setting any secondary or tertiary functionality of a network device. For instance, a tile for a device having extended operational modes and/or tertiary functionalities and can include a full drawer with interactive elements for scheduling operation of the device (i.e., setting on/off times), selecting auto off timeouts or thresholds, and/or selecting settings for putting the device into a standby, hibernate, or sleep mode. The full menus can be drop down drawers that display historical data associated with the device, such as, for example, past usage and operations information, power consumption history, and/or a last known status of the device.

In certain embodiments, the modular tile framework is provided by performing the following steps. First, a modular tile for a particular network device is designed by a tile creator, uniquely identified, and uploaded to a tile registration and discovery service. In one embodiment, the tile registration and discovery service is a cloud-based service. The modular tile can include, for example, a name of the network device, an icon for the network device, and one or more interactive elements usable to change settings for the network device. A network device may only have primary settings. One example of a primary setting is toggling the network device on and off. The settings can be displayed in hierarchical, contextual sub-menus of a tile. For example, a network device can have primary, secondary, and tertiary settings corresponding to primary, secondary, and tertiary controls or functionalities. A tile for such a device can include a sub-menu usable to select secondary settings, where the sub-menu is displayed in response to receiving a selection of a primary setting. Similarly, another menu can be displayed with tertiary settings in response to receiving a selection of a secondary setting. Next, after discovering the network device in a network, the network device's unique ID is determined, and the unique ID is used to retrieve the modular tile. This step can be performed by a mobile device and/or a gateway. When an application on the mobile device or a web site for the gateway is launched, the framework retrieves the modular tile uniquely designed for control of the newly discovered network device in a dynamic and real time fashion from the tile registration and discovery service, and displays the modular tile. The application on the mobile device is configured to display the modular tile without requiring an application reinstallation, upgrade, or update.

FIG. 1 illustrates an example of a wireless local area network 100. The local area network 100 includes network device 102, network device 104, and network device 106. In some embodiments, the network devices 102, 104, 106 may include home automation network devices that allow a user to access, monitor, control, and/or configure various home appliances located within the user's home, such as a television, radio, light, microwave, iron, and/or the like.

For example, network device 102 may include a home automation switch that may be coupled with a home appliance.

A user may wirelessly communicate with the network devices 102, 104, 106 using mobile device 108. The mobile device 108 may include a cellular telephone, a smartphone, a laptop computer, a tablet, a personal digital assistant (PDA), a computing device, wearable devices (e.g., a smart watch, or the like), or any other mobile device having wireless connection capability. While only a single mobile device 108 is shown in FIG. 1, one of ordinary skill in the art will appreciate that multiple mobile devices may connect with the network devices 102, 104, 106. The user may interact with the network devices 102, 104, or 106 using an application, a web browser, a proprietary program, or any other program executed and operated by the mobile device 108. In some embodiments, the mobile device 108 may communicate directly with the network devices 102, 104, 106 (e.g., communication signal 116). In some embodiments, the mobile device 108 may communicate with the network devices 102, 104, 106 via the gateways 110, 112 (e.g., communication signal 118) and/or the cloud network 114 (e.g., communication signal 120).

The local area network 100 further includes gateway 110 and gateway 112. Gateway 110 or 112 can be utilized for communicating with network devices 102, 104, 106 or mobile device 108 via radio signals in order to provide communication, location, and/or other services to the devices. While two gateways 110 and 112 are shown in FIG. 1, one of ordinary skill in the art will appreciate that any number of gateways may be present within the local area network 100. The wireless network provided by gateway 110 and gateway 112 may be any type of network familiar to those skilled in the art that can support data communications using any of a variety of commercially-available protocols. For example, gateways 110, 112 may provide wireless communication capabilities for the wireless local area network 100 using particular communications protocols, such as WiFi (e.g., IEEE 802.11 family standards, or other mobile communication technologies, or any combination thereof). Using the communications protocol(s), the gateways 110, 112 may transmit and receive radio frequencies with which wireless enabled devices in local area network 100 can communicate. A gateway may also be referred to as a base station, an access point, Node B, Evolved Node B (eNodeB), access point base station, a Femtocell, home base station, home Node B, home eNodeB, or the like. The gateways 110, 112 may include a router, a modem, a range extender, and/or any other device that provides wireless network access among one or more computing devices and/or external networks. For example, gateway 110 may include a router and gateway 112 may include a range extender.

The gateways 110 and 112 may also provide the mobile device 108 and the network devices 102, 104, 106 with access to one or more external networks, such as the cloud network 114, the Internet, and/or other wide area networks. The cloud network 114 may include a cloud infrastructure system that provides cloud services. In certain embodiments, services provided by the cloud network 114 may include a host of services that are made available to users of the cloud infrastructure system on demand, such as registration and access control of network devices 102, 104, 106. Services provided by the cloud infrastructure system can dynamically scale to meet the needs of its users. The cloud network 114 may comprise one or more computers, servers, and/or systems. In some embodiments, the computers, servers, and/or systems that make up the cloud network 114 are different from the user's own on-premises computers, servers, and/or systems. For example, the cloud network 114 may host an application, and a user may, via a communication network such as the Internet, on demand, order and use the application. In some embodiments, the cloud network 114 may host a Network Address Translation (NAT) Traversal application in order to establish a secure connection between the cloud network 114 and one or more of the network devices 102, 104, 106. For example, a separate secure Transmission Control Protocol (TCP) connection may be established by each network device 102, 104, 106 for communicating between each network device 102, 104, 106, and the cloud network 114. In some embodiments, each secure connection may be kept open for an indefinite period of time so that the cloud network 114 can initiate communications with each respective network device 102, 104, or 106 at any time. In some cases, other types of communications between the cloud network 114 and the network devices 102, 104, 106 and/or the mobile device 108 may be supported using other types of communication protocols, such as a Hypertext Transfer Protocol (HTTP) protocol, a Hypertext Transfer Protocol Secure (HTTPS) protocol, or the like. In some embodiments, communications initiated by the cloud network 114 may be conducted over the TCP connection, and communications initiated by a network device may be conducted over a HTTP or HTTPS connection. In certain embodiments, the cloud network 114 may include a suite of applications, middleware, and database service offerings that are delivered to a customer in a self-service, subscription-based, elastically scalable, reliable, highly available, and secure manner.

It should be appreciated that the local area network 100 may have other components than those depicted. Further, the embodiment shown in the figure is only one example of a local area network that may incorporate an embodiment of the invention. In some other embodiments, local area network 100 may have more or fewer components than shown in the figure, may combine two or more components, or may have a different configuration or arrangement of components.

Upon being powered on or reset, the network devices 102, 104, 106 may be registered with the cloud network 114 and associated with the local area network 100. In embodiments, one or more network devices, such as the network devices 102, 104, 106 illustrated in FIG. 1, can be registered on a network. When multiple network devices 102, 104, 106 and gateways 110, 112 are included within a local area network, the network devices and/or gateways may be installed at different times. For example, a network device may detect one or more gateways upon being powered on or reset. In some embodiments, a provisioning process may occur when the network device is powered on or reset. During the provisioning process, the mobile device may directly communicate with the network device. In some embodiments, direct communication between network devices 102, 104, 106 and mobile device 108 may occur using various communications protocols, such as Universal Plug and Play (UPnP), Bluetooth®, Zigbee®, Ultra-Wideband (UWB), WiFi-Direct, WiFi, Bluetooth® Low Energy (BLE), sound frequencies, and/or the like.

The provisioning process may include pairing the network device with a gateway and registering the gateway, network device, and mobile device with a server, such as a server located within the cloud network 114. For example, upon being powered on or reset to factory settings, the network device may send or broadcast identification information to a mobile device. The identification information may be sent during a discovery process. For example, the identification information may be sent in response to a discovery request from the mobile device 108. In some cases, the identification information may include a name of the network device.

An application, program, or the like that is installed on and executed by the mobile device may receive the identification information from the network device. When the application on the mobile device is launched by a user, the mobile device may display the identification information for selection by the user. Once the network device identification information is selected, the network device may send to the mobile device a list of gateways that are detected by the network device. The mobile device may receive and display the list of gateways. In some embodiments, the list of gateways includes multiple gateways (e.g., gateways 110 and 112) that are located within the local area network. The user may select the gateway that the user wishes for the network device to pair. For example, the gateway that provides the best signal strength for the network device may be selected. The mobile device may then prompt the user to enter login information that is required for accessing the network signals provided by the gateway. For example, the login information may be the same information that was originally set up to access the gateway network signals (e.g., when the gateway was initially installed). The mobile device may send the login information to the network device. The network device may use the login information to pair with the selected gateway. As one example, network device 102 and network device 104 may be paired with gateway 110, and network device 106 may be paired with gateway 112.

Once paired with a gateway, the network device may be registered with a cloud network (e.g., cloud network 114). For example, the mobile device (e.g., via the application, program, or the like) may instruct the network device to register with the cloud network upon receiving confirmation from the network device that it has been successfully paired with a gateway.

A network device may send a unique identifier to the cloud network. For example, the network devices 102, 104, 106 may send respective unique identifiers to the server located within the cloud network 114. For example, network device 102 may transmit its unique ID, via gateway 110, to the server, and network device 106 may transmit its own unique ID to the server via gateway 112. In some embodiments, in addition to the unique ID, the network device may send other information relating to the network device (e.g., MAC address, serial number, make, model number, firmware version, and/or an interface module identifier, or the like) to the server. In some embodiments, the communication of the unique ID and other information from the network device to the cloud network server may be a Hypertext Transfer Protocol (HTTP), a Hypertext Transfer Protocol Secure (HTTPS) communication, a secure Transmission Control Protocol (TCP) communication, or the like. One of ordinary skill in the art will appreciate that other communication mechanisms may be used to communicate between the network device and the cloud network server.

Once the unique IDs are received by the server, the server may register each network device and determine a visual interface module for each network device. For example, the server may register the network device 102 as a first network device. During the registration process, the server may determine or generate a first interface module ID for identifying a visual interface module suitable for controlling the first network device. As noted above, one of ordinary skill in the art will appreciate that any number of network devices may be present within the local area network, and thus that any number of network devices may be discovered and registered for the local area network.

In some embodiments, during registration of the network device 104, the server may determine that the mobile device 108 has already been registered with another network device (e.g., network device 102) that is associated with the same logical network of gateway 110. In such embodiments, the server may have used a unique ID for the previously discovered network device 102 to determine a first interface module suitable for controlling the network device 102. In such embodiments, the server may use another unique ID for the network device 104 to identify a second interface module suitable for controlling network device 104.

A record or profile may then be created in a data store at the server for associating each network device with a corresponding, known interface module so that the interface module can be provided to the mobile device. For example, the server of the cloud network 114 may associate the first network device 102 with a first interface module. Similarly, the server may associate the second network device 104 with a second interface module. In some embodiments, the server performs the association by generating and storing a record including the unique ID of the network device (e.g., MAC address or serial number of a network device), a unique ID of an interface module suitable to control the network device, and/or any other information relevant to the network device and/or the interface module. For example, the server may store a first record at a first memory space (e.g., in Flash, DRAM, a data store, a database, or the like) with the unique ID of the network device 102 and the unique ID of an interface module for monitoring and controlling the network device 102. The server may also store a second record at a second memory space along with the unique ID of the network device 106 and the unique ID of an interface module for monitoring and controlling the network device 106. In some embodiments, an example of a network device unique ID may include a MAC address of the network device, a serial number of the network device, or any other unique identifier. The technique used to store records for associating each network device with a corresponding interface module may be dependent on a type of database that is included in the cloud network 114. For example, different databases may have different proprietary mechanisms for creating unique identifiers.

The unique identifiers for each interface module may be generated using database specific technique. For example, a MySQL technique may be used to generate the unique IDs for interface modules. Each unique ID for interface modules may include a universally unique identifier (UUID) or a globally unique identifier (GUID).

As noted previously, the network devices 102, 104, 106 and gateways 110, 112 may be installed at different times. For example, in some embodiments, network device 104 may be installed at a point in time after a first logical network is created based on the pairing between gateway 110 and network device 102. In such embodiments, upon being powered on, the network device 104 may pair with gateway 110, obtain credentials from gateway 110, and transmit the credentials to the server in the cloud network 114. The server may associate the network device 104 with a known interface module. The server may also generate a record in a data store of interfaces for the network device 104. The mobile device 108 may receive the interface module for controlling the network device 104 from the server, and then store the interface module in a local cache.

A network device may send information to a mobile device. For example, the network device 102 may send to the mobile device 108 information about itself. The network device 102 and the mobile device 108 may then communicate with the cloud network server using each device's unique key. In some embodiments, the network device and the mobile device may generate a signature using their respective security key. The signature is sent to the cloud network server along with a communication from the network device or mobile device. The cloud network server may then process the signature in order to authenticate each device, as described below. The network device and mobile device may use different techniques to generate a signature.

A network device may generate a signature using its uniquely generated security key. For example, the signature may be expressed as: Authorization=MacAddress":"Signature":"ExpirationTime. The Authorization term may be an attribute, and the MacAddress, Signature, and ExpirationTime terms may include values for the Authorization attribute. In particular, the MacAddress value may include the MAC address of the network device, which may include a unique alphanumeric or numeric string. The network device may retrieve its MAC address from memory and place it in the MacAddress field. The Signature value may be expressed as: Signature=Base64(HMAC-SHA1(PrivateKey, StringToSign)). The Signature value may include an alphanumeric or numeric string. HMAC-SHA1 is an open source technique that includes a Hash-based Message Authentication Code (HMAC) using a SHA1 hash function. The HMAC-SHA1 technique uses the values PrivateKey and StringToSign as inputs. The PrivateKey input includes the unique security key that was generated by the server for the network device. The StringToSign input may be expressed as StringToSign=MacAddress+"\n"+SerialNumber+"\n"+ExpirationTime. Accordingly, the StringToSign input is generated by appending a serial number of the network device and an expiration time to the network device's MAC address. The ExpirationTime term may indicate the period of time for which the signature is valid. In some embodiments, the ExpirationTime term may include a current time at which the signature is generated plus period of time for which the signature is valid. In one example, the ExpirationTime term may be expressed as ExpirationTime=Number of seconds since Jan. 1, 1970.

The network device may place the signature in a data packet for transmission with a communication signal to the cloud network server. The signature, if included, may be used by the cloud network server to verify that the network device is associated with the network. In some embodiments, a signature is provided with each communication sent from the network device to the server. Once the signature is received by the server, the server generates a signature using the same expression as that used by the network device. For example, the server may retrieve the network device's key and other relevant information from storage and generate the signature using the key and the other information using the expression described above. The server then verifies whether the signatures match. Upon determining that the signatures match, the server authenticates the network device's communication.

A mobile device may also generate a signature using its uniquely generated security key. For example, the mobile device signature may be expressed as: Authorization=SDU UniqueId":"Signature":"ExpirationTime. The Authorization term may be an attribute, and the SDU UniqueId, Signature, and ExpirationTime terms may include values for the Authorization attribute. The SDU UniqueId term may include a unique phone identifier. The SDU UniqueId value may depend on the type of mobile device that is used and the type of values that may be accessed and/or generated by the type of mobile device. In some cases, one type of mobile device may not allow an application to access a unique identifier of the mobile device (e.g., a serial number, UUID, or the like). In such cases, the SDU UniqueId value may include a value generated by an application or program installed on and executed on the mobile device that is used to access, monitor, and/or control the network device. The value may be unique to the application or program that generated the value. In other cases, another type of mobile device may allow an application to access a unique identifier of the mobile device. In such cases, the SDU UniqueId value may include a value that is unique to the mobile device itself, such as a serial number, UUID, or the like. In this example, the mobile device may retrieve the unique value from storage within the mobile device. One of ordinary skill in the art will appreciate that other unique identifiers may be used to uniquely identify the mobile device. The Signature value may be expressed as: Signature=Base64(HMAC-SHA1(PrivateKey, StringToSign)). Using this expression, the input to the HMAC-SHA1 technique may include a PrivateKey term and a StringToSign term. The PrivateKey input includes the unique security key that was generated by the server for the mobile device with regard to a particular network. The StringToSign input may be expressed as StringToSign=UniqueId+"\n"+"\n"+Expiration Time. The StringToSign value is different from the StringToSign value generated by network device in that no serial number is included. Accordingly, the StringToSign input is generated by appending an expiration time to the mobile device's unique identifier. The ExpirationTime term may indicate the period of time for which the signature is valid, similar to that above for the signature generated by the network device.

The mobile device may place the signature in a data packet and may transmit the data packet to the cloud network server with a communication signal. The signature, if included, may be used by the cloud network server to verify that the mobile device is associated with the network and authorized to communicate with one or more network devices associated with the network. In some embodiments, a signature is provided with each communication sent from the mobile device to the server. The cloud server may receive the signature and may generate a signature using the same expression as that used by the mobile device. For example, the server may retrieve the mobile device's key and other relevant information from storage and generate the signature using the key and the other information using the expression described above. The server then verifies whether the signatures match. Upon determining that the signatures match, the server authenticates the mobile device and allows it to communicate with one or more of the network devices associated with the network.

As shown in FIG. 1, once the registration process is completed, the mobile device 108 may access the network device 102 locally via the gateway 110 (e.g., communication signal 118) or remotely via the cloud network 114 (e.g., communication signal 120). In some embodiments, the communication between the mobile device 108 and the cloud network 114 may be a HTTP or HTTPS communication. One of ordinary skill in the art will appreciate that other communication mechanisms may be used to communicate between the mobile device 108 and the cloud network 114.

As previously described, the mobile device, when located within range of the local area network, may be authenticated using accountless authentication that is based on the mobile device's authentication with the network. For example, if the mobile device has authorized access to the network (e.g., a WiFi network provided by a gateway), the network devices paired with that network may allow the mobile device to connect with them without requiring a network device login. Accordingly, the network device may perform accountless authentication of mobile devices that have authorization to access the network without requiring a user to provide login credentials for the network devices. While located remotely, the mobile device may also be authenticated to access, monitor, and/or control the network devices via the cloud network using an accountless authentication process. For example, a network ID and the mobile device's unique security key may be used to allow the mobile device to communicate with the network devices via the cloud network (e.g., by generating a signature as described above).

Figure 2:
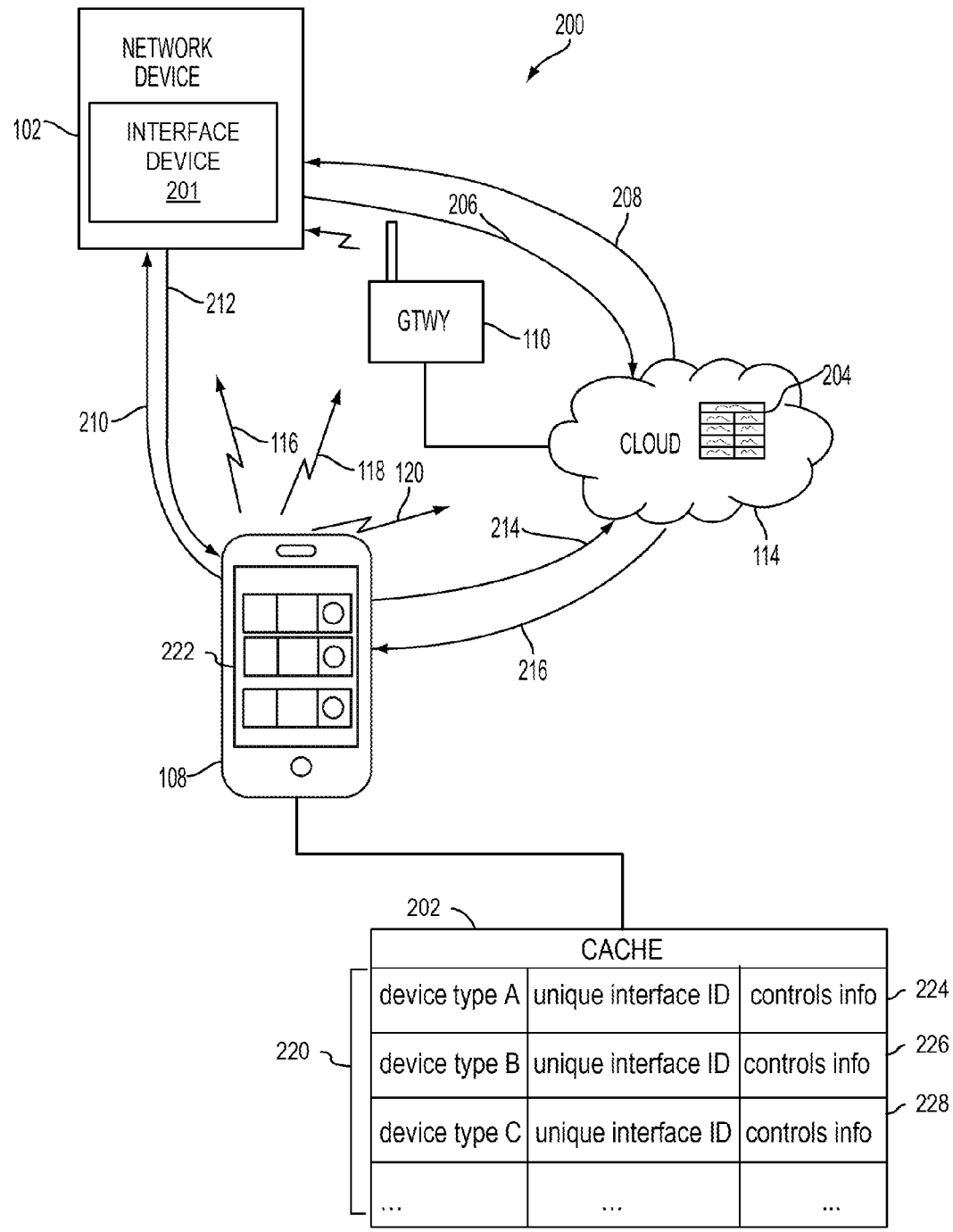
FIG. 2 is an illustration of data flows for providing visual interface modules within an example wireless network environment, in accordance with some embodiments.

FIG. 2 illustrates an embodiment of a process 200 for providing a visual interface module for controlling a network device. As shown, the process 200 may be performed by one or more computing devices, such as network device 102, a server associated with cloud network 114, and mobile device 108 described above with reference to FIG. 1. In some embodiments, the network device 102 is associated with a home automation network, such as the local area network 100 described above with respect to FIG. 1. Process 200 is illustrated as a data flow diagram, the operation of which represents operations that can be implemented in hardware, computer instructions, or a combination thereof. Gateway 110 is connected to cloud network 114, and allows network device 102 to connect to the cloud network 114, the Internet, or other external networks via gateway 110. In some embodiments, the network device 102 may be a home automation network device that allows a user to access, monitor, control, and/or configure various home appliances located within the user's home, such as a television, radio, light, microwave, iron, space heater, sensor, and/or the like. For example, the user can monitor and control network devices by interacting with a visual interface of the gateway 110 (i.e., a web page for gateway 110) and/or a visual interface rendered on display 222 of the mobile device 108.

In an embodiment, an application may be run on the mobile device 108. The application may cause the mobile device 108 to present a display 222 with a modular visual interface for each network device accessible on the local area network 100. When the application is run on the mobile device 108, the mobile device 108 can access a cache 202.

The cache 202 can be a local cache located in onboard storage of the mobile device 108. The cache 202 can contain a known interface list 220 with records 224, 226 and 228 including interface information for different, known types of network devices. As shown, each of records 224, 226 and 228 can include a device type, a unique interface module ID, and controls information. The known interface list 220 can include a record for each device known by the mobile device 108 to exist on the local area network 100. When the application is run on the mobile device 108, the mobile device 108 can access the known interfaces 220 in the cache 202 to present the display 222, which lists modular interfaces for each network device on the local area network 100. In an example, the display 222 can include a modular tile for each connected network device having an interface in the known interface list 220. Exemplary communications used to populate cache 202 are described in the following paragraphs.

The process 200 can include utilizing communication 206 to register a visual interface module for a network device 102 with a server of cloud network 114. For simplicity, communication 206 is shown as a direct communication between network device 102 and cloud network 114. However, it is to be understood that in an embodiment, communication 206 can be sent from a manufacturer of network device 102 to cloud network 114. In an additional or alternative embodiment, communication 206 is sent from third party interface developer to cloud network 114. For example, a third party developer of a visual interface module for network device 102 may initiate communication 206 to cloud network 114. In the example of FIG. 2, communication 206 includes registration information for the network device 102. For example, communication 206 can include a unique device ID for network device 102. In some embodiments, the registration information may identify one or more capabilities of network device 102. The registration information can include a unique identifier for the network device, a default name of the network device, one or more capabilities of the network device, and one or more discovery mechanisms for the network device. In one example, communication 206 can include a resource bundle corresponding to network device 102. The resource bundle can be embodied as a structured folder structure whose contents define all visual and interactive elements in a tile. For example, a resource bundle can be a zip file sent from a device manufacturer or a third party developer that is submitted or uploaded to cloud network 114. The resource bundle includes a unique device ID and files defining graphical content of a visual interface module. The graphical content can include definitions of interactive elements for the interface module. The resource bundle can include templates defining interactive control states for each of the interactive elements, language translations for tile text, any menus for the tile, and graphical content of the menus. For example, the resource bundle can define templates, text, and graphical content using a markup language, such as HTML5.

At 206, the process 200 includes transmitting an indication that network device 102 is associated with the network. For example, network device 102 may transmit the indication to the server of the cloud network 114. In some embodiments, the transmitting may include transmitting a unique identifier (ID) for the network device 102. For example, the network device 102 may send a communication to the server indicating a unique interface module ID for the network device 102. In such embodiments, the server may then determine that a match between the unique interface module ID and a known interface exists. The cloud network 114 can include a data store 204 of known interfaces. The mobile device 108 can download the a visual interface module identified in data store 204 from the cloud network 114, which can be used to render a modular interface within display 222. In an embodiment, data store 204 can be a tile database where each record in the database is uniquely identified by a tile ID.

Cloud network 114 can use the unique device ID to determine an interface module for network device 102. As shown in FIG. 2, cloud network 114 can access a data store 204 of visual interface modules. A plurality of uniquely identified interface modules can be stored in data store 204. For example, each interface module in data store 204 can be associated with a unique interface module ID. In an embodiment, data store 204 is a database configured to store modular tiles for a plurality of network devices, with each of the stored modular tiles being identified by a unique tile ID. For instance, the network device 102 having a unique device identifier may be matched with an existing interface module based on comparing information received from the network device 102 with information stored in data store 204. In cases where an existing interface module for network device 102 is not found in data store 204, cloud network 114 can use information in a resource bundle for the network device 102 to generate an interface module, where the resource bundle is provided as part of a registration process for a given network device. The generated interface module can then be stored in data store 204 and assigned a unique interface module ID. In some embodiments, information in the resource bundle can be used to update an existing interface module stored in data store 204. After determining the interface module for network device 102, cloud network 114 sends communication 208 to network device 102 in order to provide a unique interface module ID to the network device 102. In one embodiment, communication 208 can include a unique tile ID corresponding to a modular tile for network device 102 that is stored in data store 204. In some embodiments, communication 208 includes a unique tile ID corresponding to a modular tile defined for network device 102. Upon receiving communication 208 with the unique interface module ID (i.e., a unique tile ID), the network device 102 can store the unique interface module ID. For example, the unique interface module ID can be stored by an interface device 201 of the network device 102 that is configured to provide the interface module ID to a mobile device or gateway. In an embodiment, the interface device 201 is implemented as a 'smart module' in hardware and firmware, such as, for example, a system on a chip (SOC) integrated into the network device 102.

The interface device 201 can include flash memory and dynamic random access memory (DRAM). The flash memory may be used to store instructions or code relating to an operating system, one or more applications, and any firmware. The flash memory may include nonvolatile memory so that any firmware or other program can be can updated. In the event the interface device 201 loses power, information stored in the flash memory may be retained. The DRAM of the interface device 201 may store various other types of information needed to run the interface device 201, such as all runtime instructions or code. The flash memory or DRAM or a combination thereof may include all instructions necessary to communicate with network device 102.

The process 200 can include sending, from the mobile device 108, intra-network communication 210 including a query, to the network device 102. The query can be a request for information such as a query for capabilities, a request for an identity of the network device 102, and/or a request for a unique interface module ID. For example, communication 210 can be sent from mobile device 108 to network device 102 to query network device 102 about its identity. In response to the query sent from mobile device 108, the process 200 can include receiving intra-network communication 212 at the mobile device 108 with device information for the network device 102. According to an embodiment, in response to the query, the network device 102 can send communication 212 to inform the mobile device 108 of the identity and/or capabilities of the network device 102. For instance, in response to receiving the query, the network device 102 may send communications 212 to the mobile device 108 with at least a unique interface module ID. The process 200 can include utilizing intra-network device communications 210 and 212 as part of a discovery process for the network device 102. For example, when the network device 102 is initially connected to the network, it and mobile device 108 can automatically exchange communications 210 and 212 to provide the mobile device 108 with information that can be used to determine a basic, default visual interface stored in cache 202.

Within the context of a modular tile framework, embodiments can dynamically render a functional user interface without having to download the appropriate interface template from a remote server, such as a server associated with the cloud network 114, in order to control a newly discovered network device. These embodiments can be used in cases where a connection to the Internet or the cloud network 114 is unavailable or unreliable, and immediate use of a newly discovered network device is desired. In this case, an application on the mobile device 108 or a stationary device such as gateway 110 could, based on certain information received from the network device 102, dynamically render a functional interface for immediate use. Such a functional interface may not be the ideal, visually optimized, interface that is downloadable from the cloud network 114. However, such a functional interface will suffice until the application is able connect to the Internet and/or the cloud network 114 and subsequently download the appropriate and visually optimized interface module for the network device 102.

In some embodiments, communication 212 may be received when the network device 102 is rebooted (e.g., powered on, reset or restored to default settings, or the like). For example, when the network device 102 is rebooted, it may broadcast one or more messages on the local area network 100 to discover whether there are any mobile devices in the local area network 100. For example, communication 212 may be broadcast according to a UPnP protocol during a discovery process. The network device 102 may receive communications 210 from mobile device 108 indicating that it is located within the local area network 100 and interrogating network device 102 about its functionalities. That is, after receiving a broadcast message from network device 102, mobile device 108 may then query network device 102 by sending communication 210 in order to receive the communication 212 including information about the network device.

After receiving communication 212, if the mobile device 108 can access the cloud network 114, it sends a communication 214 to the cloud network 114 as a request for an interface module for the network device 102. Communication 214 is described in further detail below. Otherwise, if the mobile device 108 cannot access the cloud network 114, the mobile device 108 looks up the unique interface module ID received from the network device 102 in cache 202. As discussed above, cache 202 can be a local cache stored on the mobile device 108. Basic properties for known interfaces can be stored in cache 202 as a device type and controls information. These basic properties can include, for example, a default icon, a default name, and interactive elements for controlling one or more primary functionalities of a network device. The primary functionalities can include, for example, powering the network device on and off. The basic properties can also include controls information for secondary functionalities.

In some embodiments, when the mobile device is connected to the cloud network 114, the mobile device 108 sends communication 214 to query the cloud network 114 about network device 102. The communication 214 can include at least the unique interface module ID for the network device 102. At this point, the cloud network 114 can compare the unique interface module ID of the network device 102 to known interface module IDs stored in data store 204 in order to determine that there is a match between the unique interface module ID sent with communication 214 and a known interface module. If the cloud network 114 finds an interface module in its data store 204, it transmits the interface module to the mobile device 108 via communication 216. For example, if the mobile device 108 is currently using a default interface module for network device 102 that was determined based on exchanging communications 210 and 212, and then subsequently is able to connect to the cloud network 114, communications 214 and 216 between the mobile device 108 and the cloud network 114 can be used to obtain an updated interface module for the network device 102.

Upon receiving communication 216 from the cloud network 114, the mobile device 108 populates a record in cache 202 corresponding to the network device 102 with device type and controls information received via communication

216. That is, when the mobile device is remote from the local area network 100, it can exchange communications 214 and 216 with the cloud network 114 to receive an interface module for a network device. Information received via communications 216 can be used to populate records of cache 202. Records in cache 202 can be updated using modular interfaces received via communication 216. In additional or alternative embodiments, new records can be created in cache 202 when communication 216 includes a modular interface for a newly discovered network device.

Records 224, 226, 228 in cache 202 store device types, unique interface module IDs, and controls information for known network devices. The mobile device 108 uses the records in cache 202 to render visual interfaces in the display 222. For example, the display 222 can include a navigable list of modular tiles corresponding to network devices in the local area network 100.

Display 222 can also include an indicator representing a state of network device 102. In embodiments, communications 212 and/or 214 can include a last known state of the network device 102 and/or historical data associated with the network device 102. In one embodiment, such state information can be based on information received via communication 212 from the network device 102 when the mobile device 108 is connected to the local area network 100. In this way, display 222 of the mobile device 108 can reflect a current state and historical data for the network device 102 when the mobile device is not connected to the local area network 100. In additional or alternative embodiments, the state information can be based on information received via communication 216 from the cloud network 114 when the mobile device 108 is connected to the cloud network 114. Using the state information, an interface module or tile for the network device 102 within display 222 can indicate an 'on' or 'off' state for the network device 102 when the network device is powered on or off.

Figure 3:
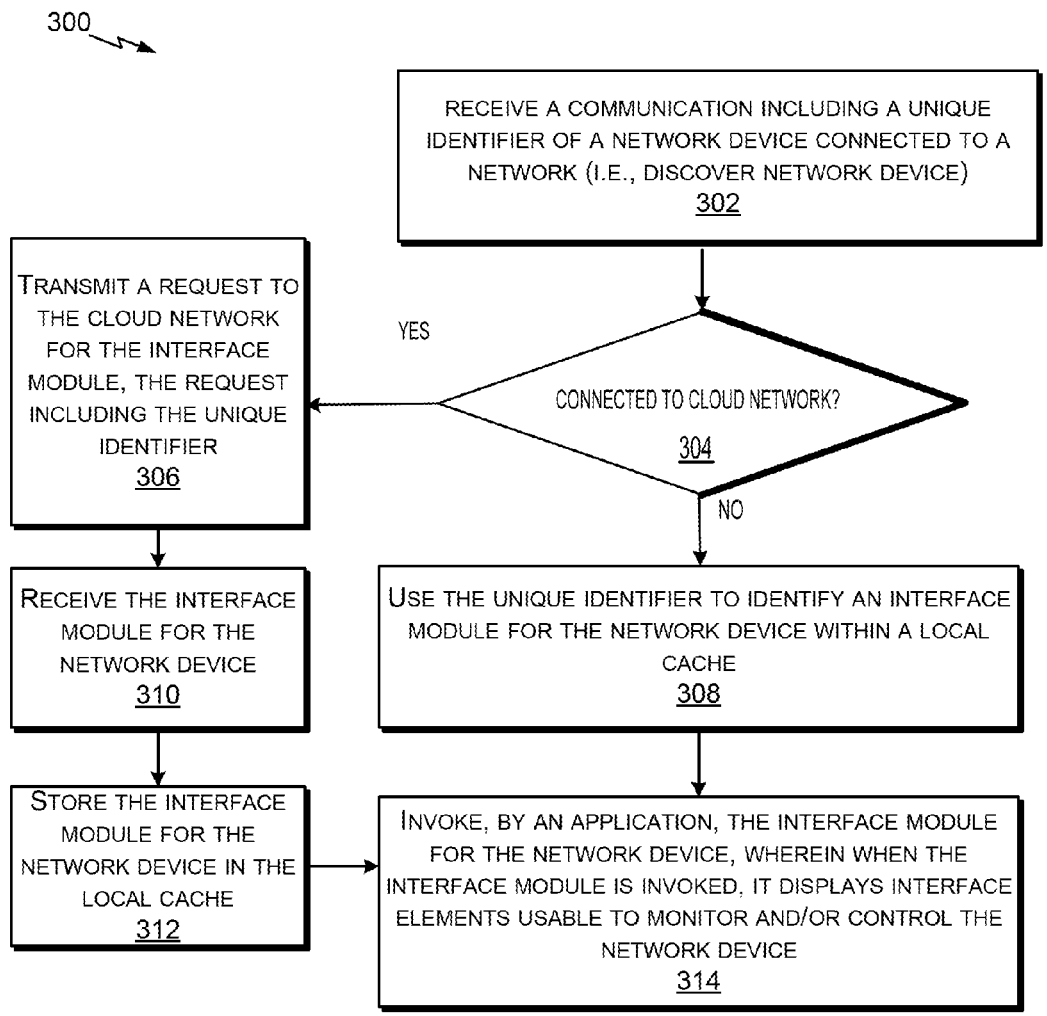
FIG. 3 is a flowchart illustrating embodiments of processes for determining and transmitting visual interface modules for controlling network devices, in accordance with some embodiments.
Figure 4:
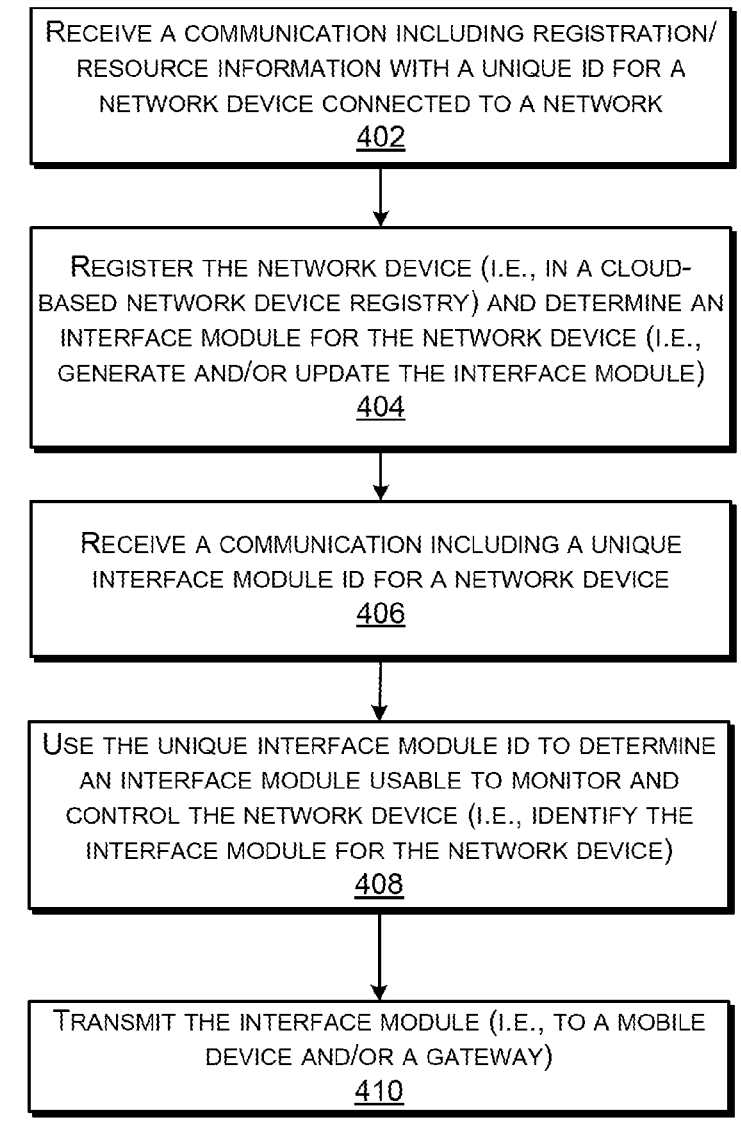
FIG. 4 is a flowchart illustrating embodiments of processes for providing visual interface modules for controlling network devices, in accordance with some embodiments.
Figure 5:
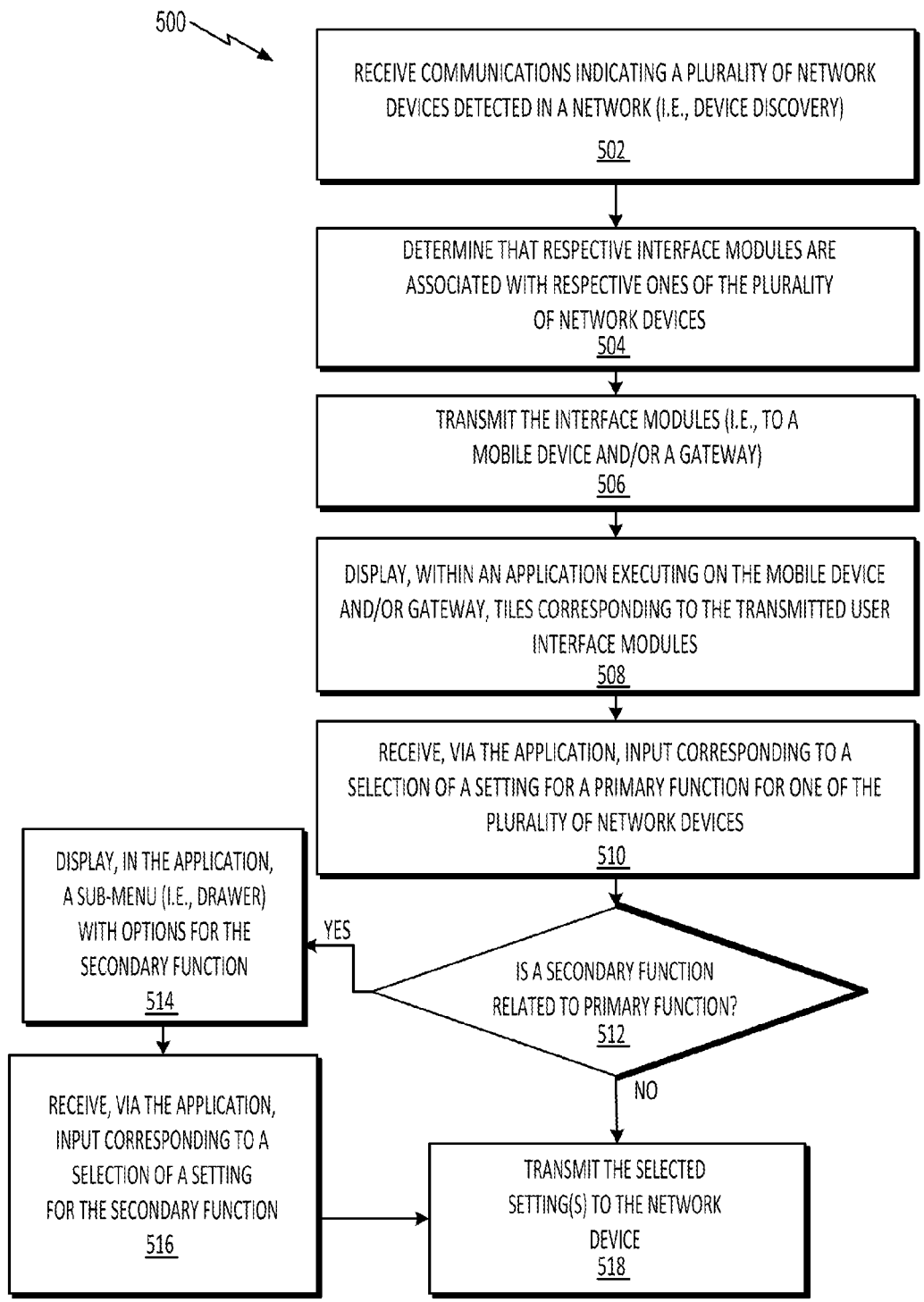
FIG. 5 is a flowchart illustrating embodiments of processes for providing visual interface modules for controlling network devices, in accordance with some embodiments.

FIGS. 3-5 provide techniques for providing visual interface modules for controlling network devices that exist within a local area network. The techniques allow a user of a mobile device to monitor and control network devices within the local area network regardless of whether the mobile device has previously been associated with or connected to the network devices. For example, using the techniques described below, the server of the cloud network 114 may determine that a newly discovered network device is connected with the wireless local area network 100, and use a unique ID to retrieve a previously registered visual interface module for the network device. Upon determining that a visual interface module for the network device exists, the server may provide the interface module to a mobile device 108 associated with the wireless local area network 100.

Processes 300, 400, and 500 are illustrated as a logical flow diagrams, the operation of which represents operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, applications, objects, components, data structures, and the like that perform particular functions or implement particular data types. The order in which the operations are described is not intended to be construed as a limitation, and any number of the described operations can be combined in any order and/or in parallel to implement the processes.

Additionally, the processes 300, 400, and 500 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory. The process 300 utilizes intra-network communications to inform a mobile device of the existence of a network device and to provide an interface module for the network device to the mobile device. In some aspects, the processes 300, 400, and 500 may be performed by one or more computing devices, such as the server of the cloud network 114, the mobile device 108, the gateway 110, and the network device 102 discussed above with respect to FIGS. 1 and 2.

FIG. 3 shows a flow chart showing an exemplary set of steps for a process 300 of determining and transmitting an interface module usable for controlling a network device. At 302, the process 300 includes receiving a communication including a unique identifier of a network device connected to a network. As shown in FIG. 3, this step can be performed as part of discovery of a network device. In an embodiment, the communication received in 302 can include a unique interface module ID for a network device. For instance, step 302 can be performed using communications 210 and 212 described above with reference to FIG. 2.

Next, at 304, a determination is made as to whether a connection to a cloud network exists or can be established. If it is determined that a connection to the cloud network exists, control is passed to 306 where a request is transmitted to the cloud network. The request transmitted in 306 can be a request for an interface module for the network device, where the request includes the unique identifier received in 302. Otherwise, if it is determined that no connection to the cloud network exists, control is passed to 308.

At 308, the unique identifier received at 302 is used to identify an interface module for the network device within a local cache. In embodiments, the identification performed in 308 can be performed on a mobile device. For example, the local cache can be the local cache 202 of mobile device 108 described above with reference to FIG. 2.

At 310, the process 300 includes receiving an interface module for the network device. In an embodiment, the interface module is received from a cloud network 114 in response to the request transmitted at 306. For example, 310 can be performed using communications 214 and 216 described above with reference to FIG. 2.

Next, at 312, the process 300 includes storing the received interface module in the local cache. For example, 312 can be performed by storing information for the received interface module as a record in the cache 202 of a mobile device 108.

At 314, an application invokes the interface module for the network device. Depending on the determination made in 304, the interface module can be a module received from the cloud network or an existing interface module identified in the local cache. Step 314 can be performed by an application executing on a mobile device or a gateway. As shown in FIG. 3, when the interface module is invoked, it displays interface elements usable to monitor and/or control the network device.

FIG. 4 illustrates another embodiment of a process 400 for providing interface modules for controlling network devices. In some aspects, the process 400 may be performed by a computing device, such as the server of the cloud network 114 discussed above with respect to FIGS. 1 and 2.

The process 400 utilizes intra-network communications to inform a cloud network server of the existence of a network device and to provide an interface module for the network device to a mobile device. At 402, the process 400 includes receiving a communication, wherein the communication includes registration and/or resource information for a network device connected to a network. The network may include a local area network (e.g., local area network 100). For example, the server of the cloud network 114 may receive communications from one or more of network devices 102, 104 and/or 106. As previously described with respect to FIG. 1, the network devices 102, 104, and/or 106 may send a communication to the server indicating that they are connected to the network, where the communication includes a unique device ID. For example, the network devices 102 and 104 may send a first unique identifier and a second unique identifier to the server, as previously described, and let the server determine respective interface modules corresponding to each of network devices 102 and 104. As previously described with respect to FIG. 1, a network device manufacturer or third party interface developer can send registration information to the cloud network 114. For example, 402 can include receiving a resource bundle defining a visual interface module for a network device. In an embodiment, the interface modules can be tiles based on standardized design templates. For instance, the tiles can be developed in accordance with the design templates, uniquely identified, and uploaded to the server. In one embodiment, the server can host a cloud-based tile registration and discovery service and the tiles can be uploaded to the service by tile creators and developers.

At 404, based on the communication, the server may register the network device using information received at 402. As shown, step 404 can include determining an interface module for the registered network device. For example, the interface module can be generated or updated based on the resource information, assigned a unique interface module ID, and then stored in data store 204 of the cloud network 114.

Next, at 406, the process 400 includes receiving a communication including a unique interface module ID for a network device. In an embodiment, 406 can include receiving communication 214 from a mobile device 108 as described above with reference to FIG. 2. For example, a mobile device 108 may discover a network device 102, retrieve its interface module ID, and submit that unique ID to the cloud network 114 in order to retrieve a visual interface module from a server.

At 408, the unique interface module ID is used to determine an interface module for the network device. This can be performed by determining that a match exists between the unique interface module ID received at 406 and a unique interface module ID in data store 204.

At 410, the process 400 includes transmitting the identified interface module so that it can be used to control the network device. For example, in 410, a server of the cloud network 114 may transmit an identified interface module to a mobile device 108. Various techniques may be used to provide interface modules for controlling network devices. In some embodiments, the server may designate an interface module from among the currently existing interface modules to be the interface module to be used for controlling a network device. As one example, determining the interface module may include using information about a network device to search a data store 204 of interfaces and designating an interface module as corresponding to the network device. For instance, the server may use the unique device ID of a network device to identify a known interface module previously stored by the server. As another example, the process 400 may include obtaining other information about the network device, such as a make, model, and/or serial number of the network device, and then determining an interface module based on the other information.

FIG. 5 illustrates an embodiment of a process 500 for providing interface modules for controlling network devices. In some aspects, the process 500 may be performed by computing devices, such as mobile device 108, the gateway 110, and the server of the cloud network 114 discussed above with respect to FIGS. 1 and 2.

The process 500 utilizes intra-network communications to inform a cloud network server of the existence of network devices and to provide interface modules for the network devices to a mobile device and/or a gateway. At 502, the process 500 includes receiving communications indicating that network devices have been detected in a network. As shown in FIG. 5, 502 can be performed as part of device discovery.

At 504, visual interface modules are identified for the discovered network devices. This can be accomplished by looking up unique interface module IDs in a data store 204 of interface modules. Next, at 506, the interface modules corresponding to the network devices are transmitted. In an embodiment, step 506 can include transmitting interface modules to a mobile device 108 and/or a gateway 110 associated with a given network.

At 508, the process 500 includes displaying, within an application executing on the mobile device and/or gateway, tiles corresponding to the transmitted user interface modules. This can be accomplished by rendering the display 222 described above with reference to FIG. 2. Next, at 510, input corresponding to a selection of a setting for a primary function for one of the network devices is received. In an embodiment, 510 can include receiving a touch input at an interactive element of a tile for a given network device. Then, at 512, the process 500 includes determining whether a secondary function is related to the primary function. If it is determined that there is a related secondary function, control is passed to 514 where a sub-menu, such as, for example, a peekaboo drawer, is displayed with options for the secondary function. In an embodiment, 514 can include automatically displaying the sub-menu and indicating a default selection for the secondary function. For example, if the primary function selected at 510 turned on a space heater network device, step 514 can include displaying low, eco, medium, and high secondary operational modes for the space heater and indicating that a default setting of eco mode has been selected.

Next, at 516, input corresponding to a selection of a setting for the secondary function can be received. At 518, the process 500 includes transmitting the selected setting(s) to the network device. In an embodiment, 518 can include sending intra-network device communication 210 from a mobile device 108 to a network device 102, where communication 210 includes control instructions corresponding to the selected setting(s).

Once any of the above techniques are used to provide an interface module corresponding to a network device, the interface module can be executed by an application executing on a mobile device in order to allow the mobile device to monitor and control the network device. The server may store unique identifier (e.g., network device MAC address)

of a first network device 102 and a corresponding interface module ID in a first logical record of a data store 204 of interfaces at a first memory space. The server may also store the unique identifier of a second network device 104 and its corresponding interface module ID in a second record of data store 204 at a second memory space. In some embodiments, the data store 204 of interfaces includes pointers. For example, a pointer stored with each record may point a program to a memory location where code for an interface module is stored. In an embodiment, the code can be in a markup language, such as, for example, HTML5. In certain embodiments, the code defines a modular tile having an icon, a name, and one or more interactive elements useable to control a network device. By storing pointers to interface modules, all of the information needed to obtain a tile is accessible from the data store. For example, using a pointer, code for rendering a modular tile within a graphical interface used to control network devices can be obtained and provided to a mobile device.

Another technique for providing an interface module for controlling a network device may include creating a new interface module. For example, this technique may include determining that a custom interface module for a network device does not exist, creating a new, default interface module based on information about the network device, and designating the new interface module as the interface module to be used for controlling the network device. A new record may then be created including a unique interface module identifier for the newly created interface module. The server may store the new record in the data store 204 of interfaces.

Once any of the above techniques are used to identify an interface module, the server may maintain a cloud-based registry of stored interface modules in order to enable mobile devices and gateways to control network devices associated with the interface module.

Figure 6:
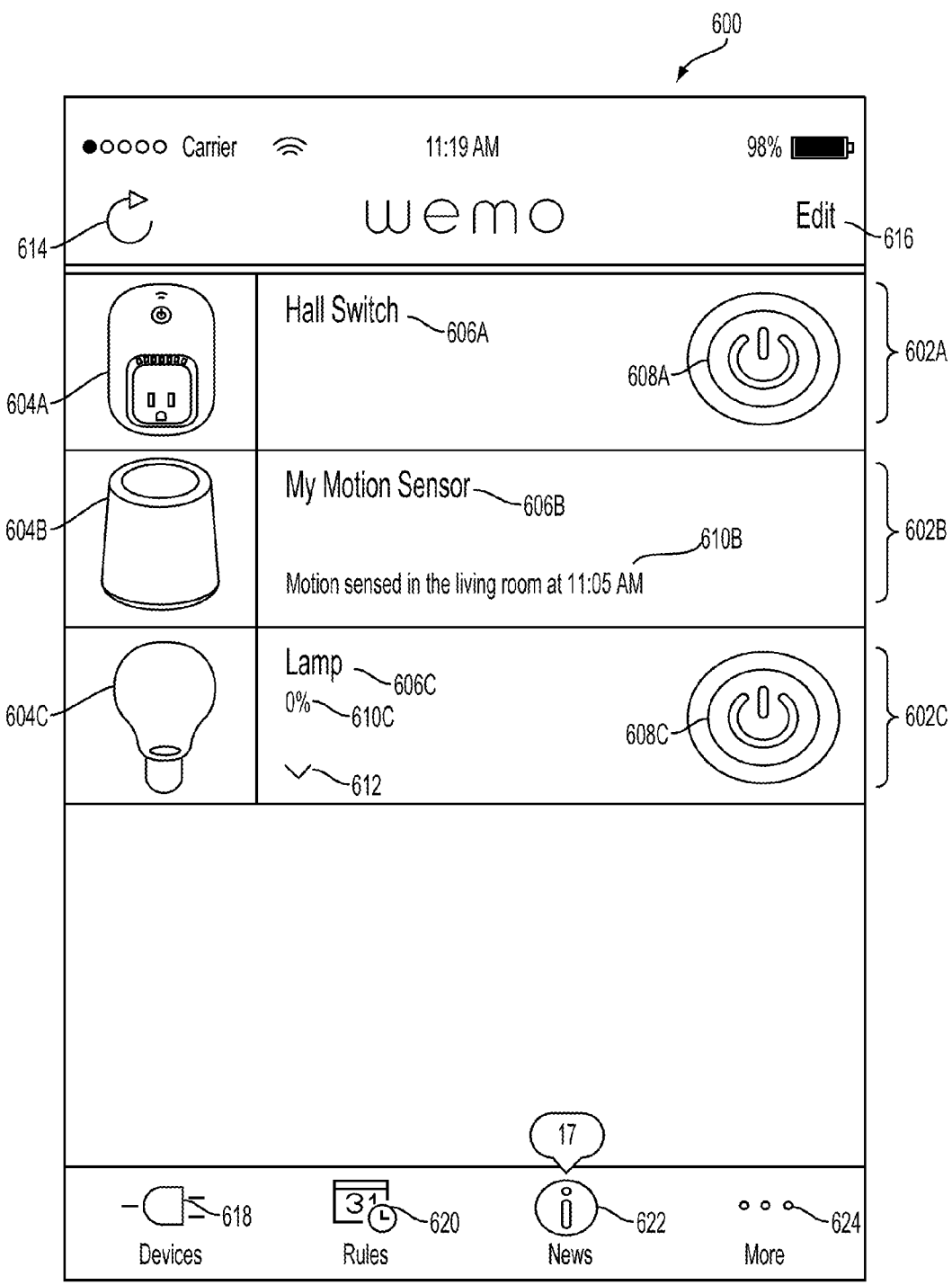
FIG. 6 depicts an example interface for controlling network devices, in accordance with some embodiments.
Figure 7:
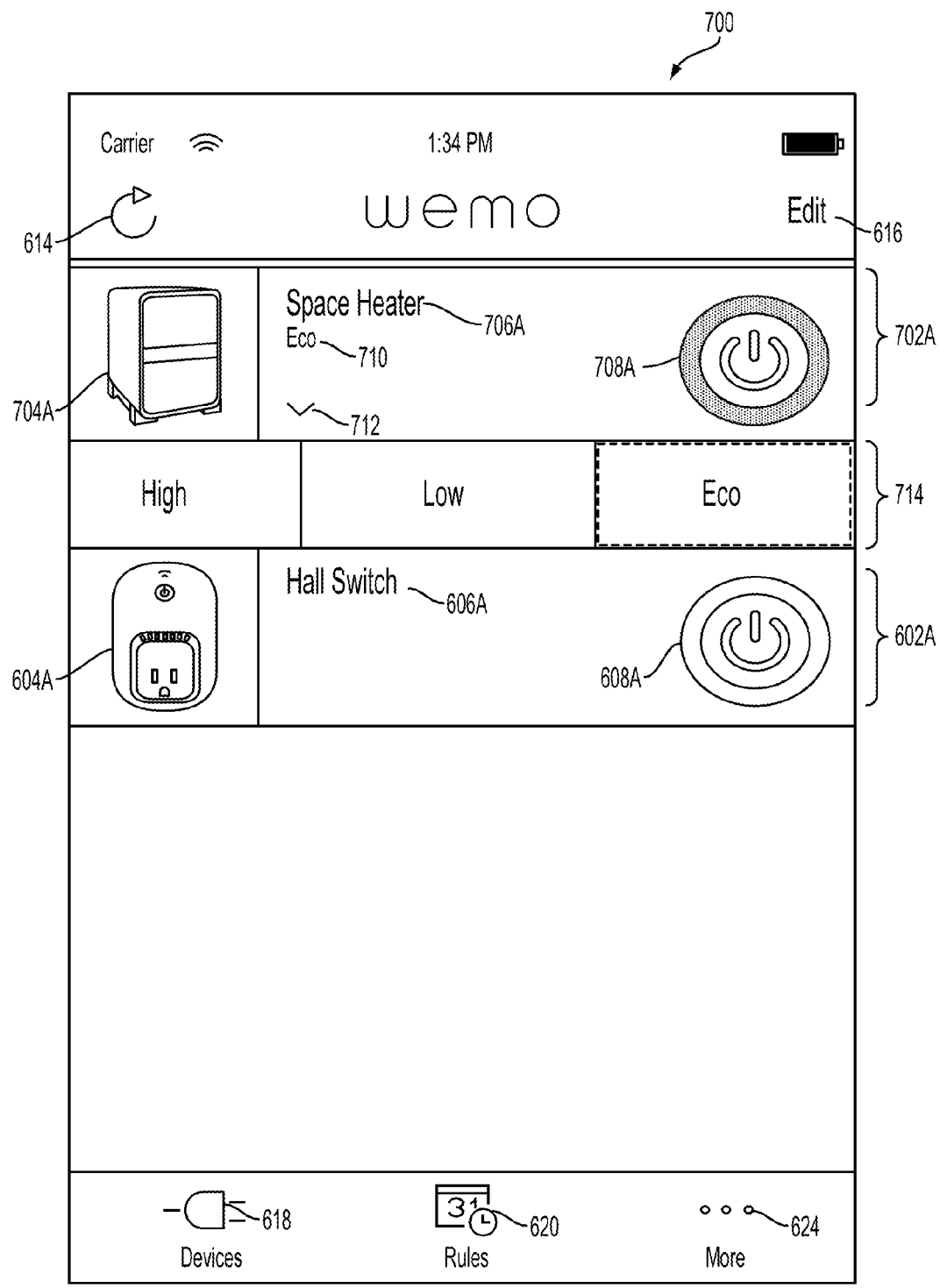
FIG. 7 depicts an example interface for controlling network devices, in accordance with some embodiments.

FIGS. 6-8 illustrate graphical interfaces, according to embodiments of the present disclosure. In particular, FIGS. 6-8 illustrate exemplary embodiments of user interface (UI) displays for an application on a mobile device. The graphical interfaces depicted in FIGS. 6-8 are described with reference to the embodiments of FIGS. 2-5 and 11. However, the graphical interfaces are not limited to those example embodiments. In an embodiment of the invention, the visual interfaces illustrated in FIGS. 6-8 are displayed on a mobile computing device, which can have a touch sensitive (i.e., touch screen) display device. For ease of explanation, the monitoring and control operations discussed below with reference to FIGS. 6-8 are described in the context of an application executing on a mobile device 108 with a touchscreen display device. However, the operations are not intended to be limited to the exemplary device shown in FIGS. 6-8. It is to be understood that the user interfaces illustrated in the exemplary embodiments of FIGS. 6-8 can be readily adapted to be rendered on displays of a variety of computing device platforms running a variety of operating systems.

Throughout FIGS. 6-8, displays are shown with various tiles, interactive elements, icons, links, command regions, windows, toolbars, sub-menus, drawers, and buttons that are used to initiate action, invoke routines, monitor network devices, configure network devices, control network devices, or invoke other functionality. The initiated actions include, but are not limited to, displaying a current state of a network device, displaying historical data associated with a network device, displaying a last known status of a network device, selecting one or more primary settings for a network device, selecting one or more secondary or tertiary settings of a network device, and other inputs and gestures. For brevity, only the differences occurring within the figures, as compared to previous or subsequent ones of the figures, are described below.

FIG. 6 shows an exemplary display 600 of an application executing on a mobile device. The display 600 includes modular tiles 602A, 602B, and 602C for interacting with network devices in a network. The interactions can include monitoring and controlling the network devices. The tiles 602A, 602B, and 602C each include respective icons 604A, 604B, and 604C, and respective names 606A, 606B, and 606C identifying different network devices. For example, tile 602A corresponds to a switch and shows an interactive element depicted as a power button 608A for turning the switch on and off. Similarly, tile 602C shows a power button 608C for turning a lamp on and off Display 600 is a visual interface usable to monitor and control one or more network devices. Display 600 includes modular tiles 602 for discovered network devices, where the tiles 602 each include an icon 604 representing a network device and a name 606 for the network device. In the example of FIG. 6, display 600 includes tiles 602A, 602B, and 602C corresponding to three different network devices. In particular, tile 602A is configured to control a switch network device. Tile 602A includes an icon 604A representing the switch and a name 606A for the switch. In embodiments, tiles 602 are customizable by developers and/or manufacturers of the network devices. For, example, name 606A is customized to indicate the name of a specific type of switch (e.g., 'Hall switch'). Tile 602A also includes an interactive element 608A that can be selected to control the switch. For example, interactive element 608A can be selected with a click or press to turn the switch on and off. Tile 602B includes an icon 604B for a sensor network device. Tile 602B includes an icon 604B representing the sensor and a name 606B for the sensor (e.g., 'My Motion Sensor'). In embodiments, tiles 602 are customizable by developers and/or manufacturers of the network devices to display a current state or status of network devices. For, example, tile 602B is customized to indicate a sensor-specific status (e.g., 'Motion sensed at 11:05 AM'). In additional or alternative embodiments, tiles 602 can convey status information about a network device, including, but not limited to, a firmware version, a last known firmware update status, connectivity to cloud status, registration status (i.e., an indication that the network device has a key or does not), a primary mode of the network device (i.e., on, off), a secondary mode of the device (i.e., standby, high, low, eco), a schedule, and settings for the device (see, e.g., schedule 834 in FIGS. 8A and 8B).

Depending on the type and capabilities of a network device, its tile 602 can display a status or state 610 of the device. For example, FIG. 6 shows how status 610B indicates when a motion sensor last detected motion. In an embodiment, the display 600 is flexible and can dynamically display the most appropriate tile 602 for whatever environment the application is run in. For instance, the display 600 enables a mechanism wherein a user can pre-configure a tile 602B to display the most appropriate message for a connected sensor. For example, a user can connect any one of a plurality of types of sensors (e.g., water, humidity, temperature/heat, air pressure, light, sound, smoke, carbon monoxide, etc.) to a network. As shown in FIG. 6, instead of presenting a default interface stating a generic message like 'the sensor has detected something at a certain time' the tile 602B can be configured it to provide a sensor-specific status (e.g., 'Motion sensed in the living room 11:05 AM' or 'someone is in the living room.'). Similarly, tiles 602 for other types of sensor devices can be configured to present sensor-specific states 610 or status messages such as, for example, 'the leak detector at a certain location has detected elevated levels of moisture' or 'the smoke detector has detected smoke in the kitchen.'

As shown in FIG. 6, the status 610C in the tile 602C for the lamp device can indicate a brightness level for the lamp. In the exemplary display 600, status 610C indicates that the lamp is at 0%, which corresponds to the lamp being turned off. In an embodiment, this status is also reflected by the power button 608C for the lamp not being lit up or shaded/bolded. When a network device has extended capabilities, such as secondary or tertiary functionalities, an interactive element 612 can be selected to expand and contract a menu including controllable settings for the capabilities. The menu can be, for example, a full drop down menu or drawer with interactive elements for setting the extended capabilities of the network device. Examples of such full menus and drawers are provided in FIGS. 8A and 8B, which are discussed below.

FIG. 6 also shows how display 600 can include selectable icons and links 614, 616, 618, 620, 622, and 624 outside of the tile display area. In the example of FIG. 6, refresh icon 614 can be selected to refresh information presented in display 600, such as, for example, status and state information displayed in tiles 602A, 602B, and 602C. For instance, the status 610B in tile 602B for the motion sensor can be refreshed on an automatic, periodic basis, in addition to being manually updated when refresh icon 614 is selected. Similarly, the brightness status 610C in tile 602C for the lamp can be updated when refresh icon 614 is selected. The edit link 616 can be selected to edit the list of tiles 602A, 602B, and 602C. For example, edit link 616 can be selected to sort or re-order the sequence of tiles 602A, 602B, and 602C displayed in display 600. Edit link 616 can also be selected to delete one of the tiles 602A, 602B, and 602C in cases where a user no longer wants to view a given tile. Devices icon 618 can be selected to list discovered network devices in a network.

Rules icon 620 can be selected to display rules pertaining to network devices. For example, rules icon 620 can be selected to display a rule that turns on the lamp of tile 602C for a specified duration when the motion sensor of tile 602B detects motion. That is, by selecting rules icon 620, a user can create or edit a rule that turns on a porch light for a certain number of minutes when a motion sensor detects motion near the porch. In this way, rules can relate functionalities of multiple network devices to each other. News icon 622 can be selected to review news items, such as news associated with network devices and/or the application. For instance, news icon 622 can be selected to view announcements and news items relevant to network devices controlled via tiles 602A, 602B, and 602C and/or information relevant to the application, such as notifications of available tile updates. The more icon 624 can be selected to access additional features of the application.

FIG. 7 shows another exemplary display 700 of an application executing on a mobile device. Display 700 shows how the status of a space heater can be conveyed within tile 702A. For example, tile 702A can show that the heater is turned by coloring, animating, or shading a portion of power button 708A. In one embodiment, a portion of power button 708A can be shaded green or bolded to indicate that the space heater has been turned on. FIG. 7 also shows how a sub-menu 714 can be exposed to select a secondary setting of the heater once power button 708A is selected. The sub-menu 714 can include settings related to the primary function of turning the network device on. In the example of FIG. 7, sub-menu 714 is a drawer that shows secondary settings corresponding to high, low, and eco operational modes for the space heater when the power button 708A is selected to turn the space heater on. Because sub-menu 714 is typically not displayed and may only be momentarily displayed when the power button 708A is selected, the sub-menu 714 can be conceptualized as a 'peekaboo drawer.' For example, sub-menu 714 may be temporarily displayed within the context of the heater being turned on. The sub-menu 714 may include a default choice for a secondary function space heater (i.e., eco mode), and can also be used to select other secondary functions (e.g., high or low). In this way, with a single input of selecting or pressing power button 702A, both primary and secondary functionalities can be set via a single input. Additional functionalities and capabilities of the space heater can be displayed by selecting interactive element 712 to expand a full menu. Examples of the full menu are shown in FIGS. 8A and 8B, which are described below.

Figure 8A:
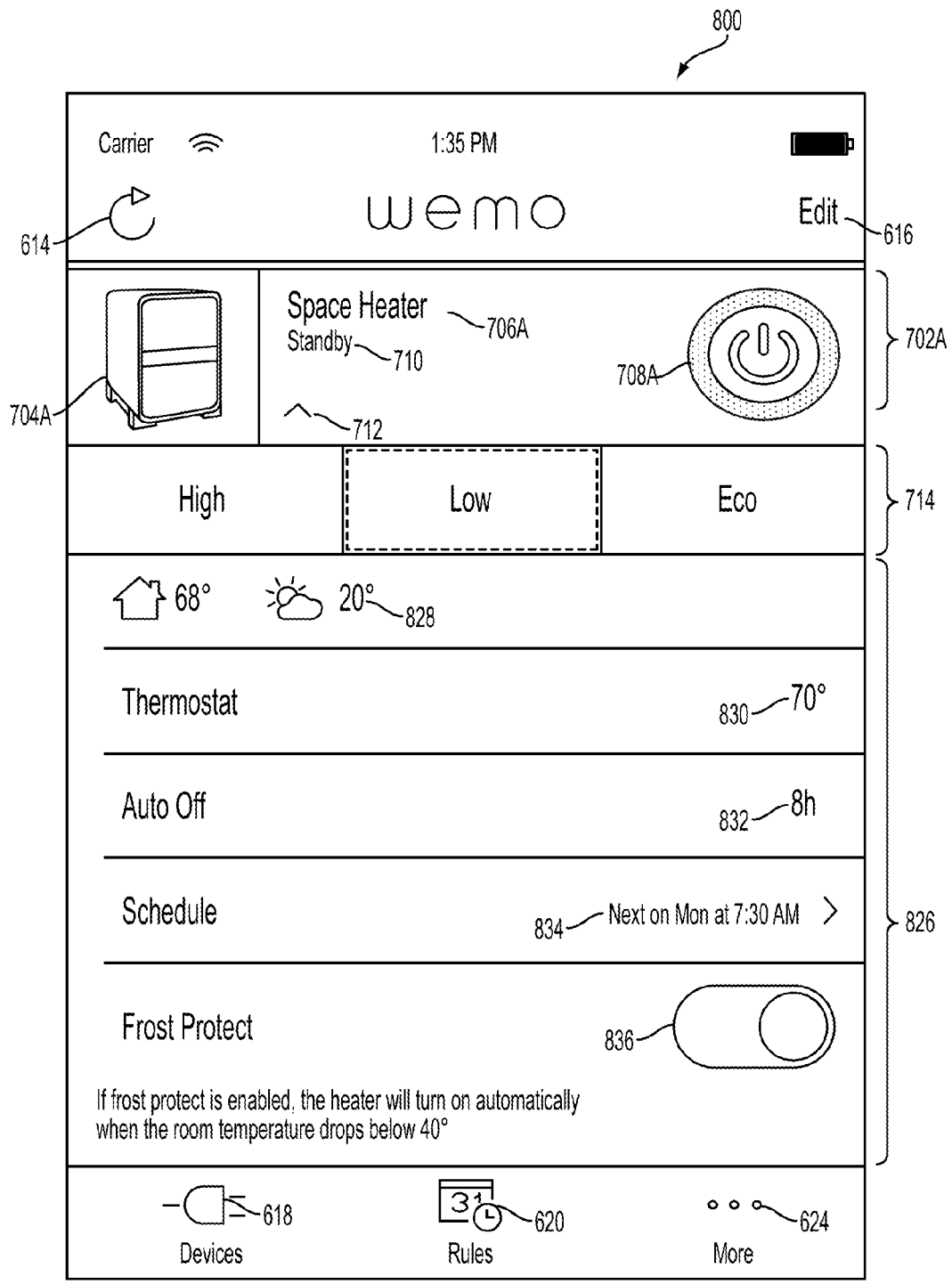
FIG. 8A depicts an example interface for controlling network devices, in accordance with some embodiments.
Figure 8B:
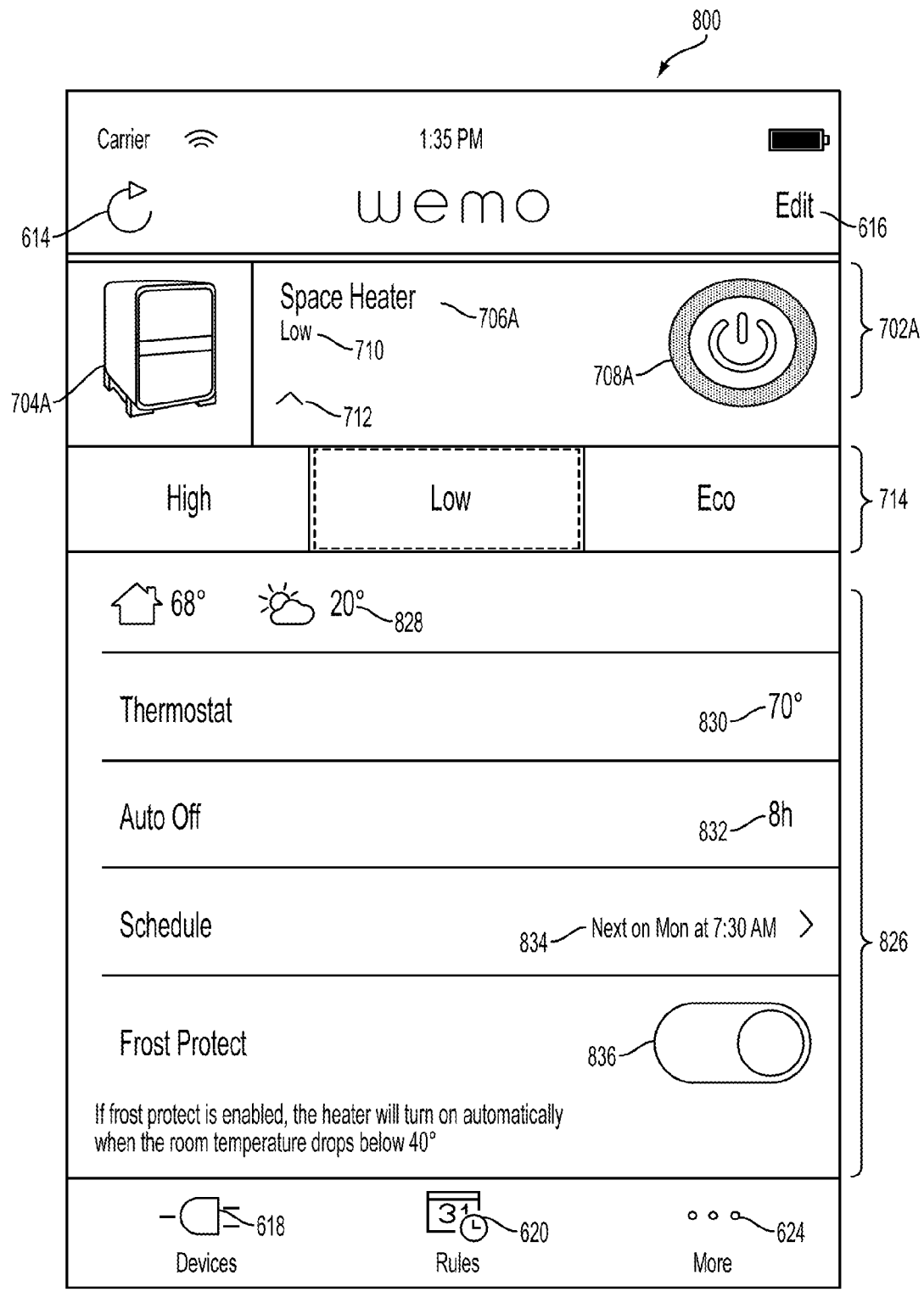
FIG. 8B depicts an example interface for controlling network devices, in accordance with some embodiments.

FIGS. 8A and 8B show another exemplary display 800 of an application executing on a mobile device. In the example of FIG. 8A, the status indicator 710 shows that the space heater is in standby mode. As shown in FIG. 8A, this status can be visually reinforced by the power button 708A being lightly shaded. FIG. 8B shows how the status indicator 710 and power button 708A can transition when the status of the space heater is changed. For example, when the power button 708A is selected to turn on the space heater, and secondary mode of 'low' is selected in sub-menu 714, FIG. 8B shows how the power button 708A is more illuminated as compared to FIG. 8A. Additionally, FIG. 8B shows how status indicator 710 transitions from 'standby' to 'low' to reflect the selection in sub-menu 714.

FIGS. 8A and 8B also show how detailed status and extended functionalities of the space heater can be conveyed within a full menu 826 accessed via tile 702A. In particular, full menu 826 can be displayed as drawer when interactive element 712 is selected. In the example of FIGS. 8A and 8B, the full menu 826 can include interactive elements 830, 832, 836 for selecting settings or actions corresponding to tertiary or extended functions of the space heater. In particular, the exemplary full menu 826 is shown as a drawer displaying room and external temperature readings 828, thermostat setting 830, an auto off setting 832, schedule information 834 for the space heater, and a frost protection setting 836. In the example of FIGS. 8A and 8B, the auto off setting 832 is a selectable duration (i.e., a number of hours). In embodiments, the auto off setting 832 can be changed via a scroll wheel interface element and/or directly entered as text. Full menu 826 can be implemented as a drawer showing historical data associated with a network device, such as, for example, past temperature readings 828 and patterns of temperature readings 828. The historical data may be used to determine tertiary settings or functionalities, such as, for example, the frost protection setting 836. As shown, the frost protection setting 836 can be toggled on an off within full menu 826. In the exemplary display 800, the space heater will automatically turn on if the room temperature falls below 40 degrees Fahrenheit. Certain extended capabilities can be tied to rules. For example, the rule for frost protection can be changed by selecting rules icon 620 in order to edit the logic for the rule.

As shown in the embodiments of FIGS. 6-8, the status or state of a network device can be indicated within the tile with text and/or graphically. For instance, coloring or shading of an interactive element, such as power button 708A, can indicate whether a network device is connected to the network, powered off, on, restarting, or in a standby, sleep or hibernation mode. In accordance with these examples, part of the power button 708A in the tile 702A can be shaded green when the space heater is powered on, red or un-shaded when the space heater is off, and yellow or lightly shaded when the space heater is in standby mode. In additional or alternative embodiments, a power button can pulsate or slowly blink when the device is in a transitional state. Examples transitional states include booting up, restarting, connecting to a network, or re-connecting to the network.

In some embodiments, the displays of FIGS. 6-8 can be rendered by performing a computer-implemented method. For example, the method can include receiving, at a computing device, one or more interface modules, wherein each interface module defines a tile associated with a corresponding network device on a network, and then presenting, on a display of the computing device, a graphical interface including the one or more tiles, wherein each tile includes information identifying the corresponding network device and one or more interactive elements usable to control the network device. For example, the computing device can be mobile device 108, the display can be display 222, and the tiles can include tiles 602A, 602B, 602C and 702A. The one or more interactive elements can correspond to a primary setting or function of the network devices, such as, for example, power buttons 608A, 608C and 708A. In embodiments, the information identifying the network devices can include an icon, name, and state for each of the network devices. For example, the information identifying the network devices can include icons 604A, 604B, 604C and 704A, and corresponding device names 606A, 606B, 606C, and 706A. The information identifying a state of a network device can be status indicators 610B, 610C, and 710. In some embodiments, the method can also include receiving, at the computing device, input corresponding to a selection of a primary setting for the network device, and the tile can include a contextual menu or drawer, such as sub-menu 714, corresponding to a secondary setting or functionality for the network device, wherein the secondary setting or functionality is associated with the primary setting or functionality. According to certain embodiments, a tile 702A associated with a network device having extended or tertiary functionalities includes a full menu or drawer 826, wherein the full menu 826 is displayed in response to receiving input corresponding to a selection of interactive element 712. For example, the full menu 826 can include interactive elements 830, 832, 836 for selecting settings or actions corresponding to tertiary or extended functions of the network device. The full menu 826 can be embodied as a drawer including a status indicator 610B, 610C, 710 for the network device, schedule data 834, and historical data associated with the network device, such as, for example, temperature readings 828.

In embodiments, the display device used to display the user interfaces shown in FIGS. 6-8 may be the display output device 1114 described below with reference to FIG. 11. According to embodiments, user inputs can be received at the touch screen displays shown in FIGS. 6-8 via the input device 1116 described below with reference to FIG. 11. However, alternative and additional input devices can be used, such as a finger, a stylus, a mouse, a keyboard, a keypad, a joy stick, a voice activated control system, or other input devices used to provide interaction between a user and an application. As described below with reference to FIGS. 6-8, such interaction can be used to indicate a network device to be monitored and/or controlled, to navigate through contextual menus associated with a network device, and make selections in the menus.

Figure 9A:
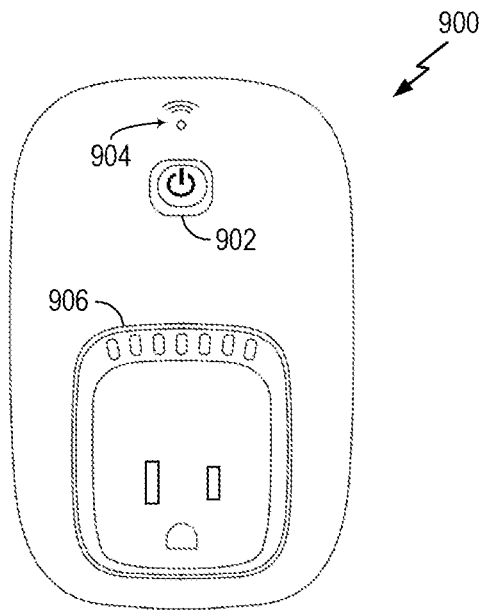
FIG. 9A is an illustration of an example of a front view of a network device in accordance with an embodiment.
Figure 9B:
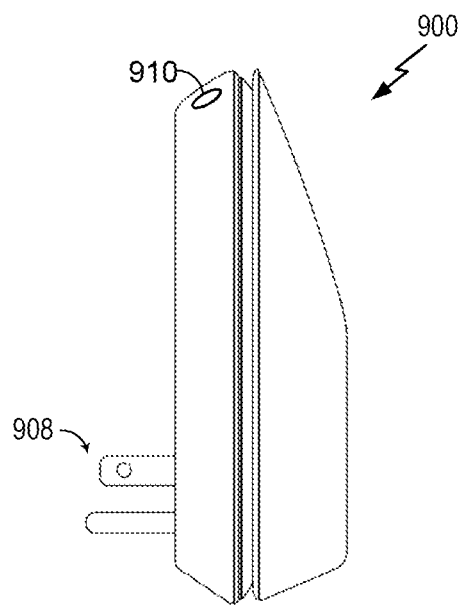
FIG. 9B is an illustration of an example of a side view of a network device in accordance with an embodiment.

FIG. 9A illustrates an example of a front view of a network device 900 and FIG. 9B illustrates an example of a side view of the network device 900. The network device may include any of the network devices 102, 104, or 106 described herein. In some embodiments, the network device 900 may be a home automation network device. For example, the network device 900 may include a home automation switch that may be coupled with a home appliance. A user may wirelessly access the network device 900 in order to access, control, and/or configure various home appliances located within the user's home. For instance, the user may remotely control appliances such as a television, radio, light, microwave, iron, space heater, wall A/C unit, washer, dryer, fan, and/or the like.

In some embodiments, the network device 900 may include a WiFi enabled switch that connects home appliances and other electronic devices to a compatible 802.11b/g/n WiFi network. The network device 900 may thus allow users to locally or remotely turn devices on or off from anywhere, program customized notifications, and/or change device status. The network device 900 may further allow a user to create custom schedules or have devices respond to sunrise or sunset.

The network device 900 includes a power switch 902 that may be depressed in order to turn the network device 900 on and off. In some embodiments, a light source may be integrated with or located behind the power switch. For example, a light-emitting diode (LED) may be located on a circuit board under the power button 902. The light source may be illuminated when the network device 900 is powered on, and may not be illuminated when the network device 900 is powered off.

The network device 900 further includes a communications signal indicator 904. The signal indicator 904 may indicate whether the network device 900 has access to a communications signal, such as a WiFi signal. For example, the signal indicator 904 may include a light source (e.g., a LED) that illuminates when the network device 900 is connected to a communications signal. The light source may depict different colors or other characteristics (e.g., flashing, dimming, or the like) to indicate different levels of signal strength or mode of operation.

The network device 900 includes a restore button 910. The restore button 910 may allow a user to reset the network device 900 to factory default settings. For example, upon being depressed, the restore button 910 may cause all software on the device to be reset to the settings that the network device 900 included when purchased from the manufacturer.

The network device 900 further includes a plug 908 and an outlet 906. The plug 908 allows the network device 900 to be plugged into a wall socket, such as a socket providing 120V, 220V, or the like. In turn, an appliance may be plugged into the outlet 906. Once the network device 900 is registered according to the techniques described above, an appliance plugged into the socket 906 may be controlled by a user using a mobile device (e.g., mobile device 108).

Figure 10:
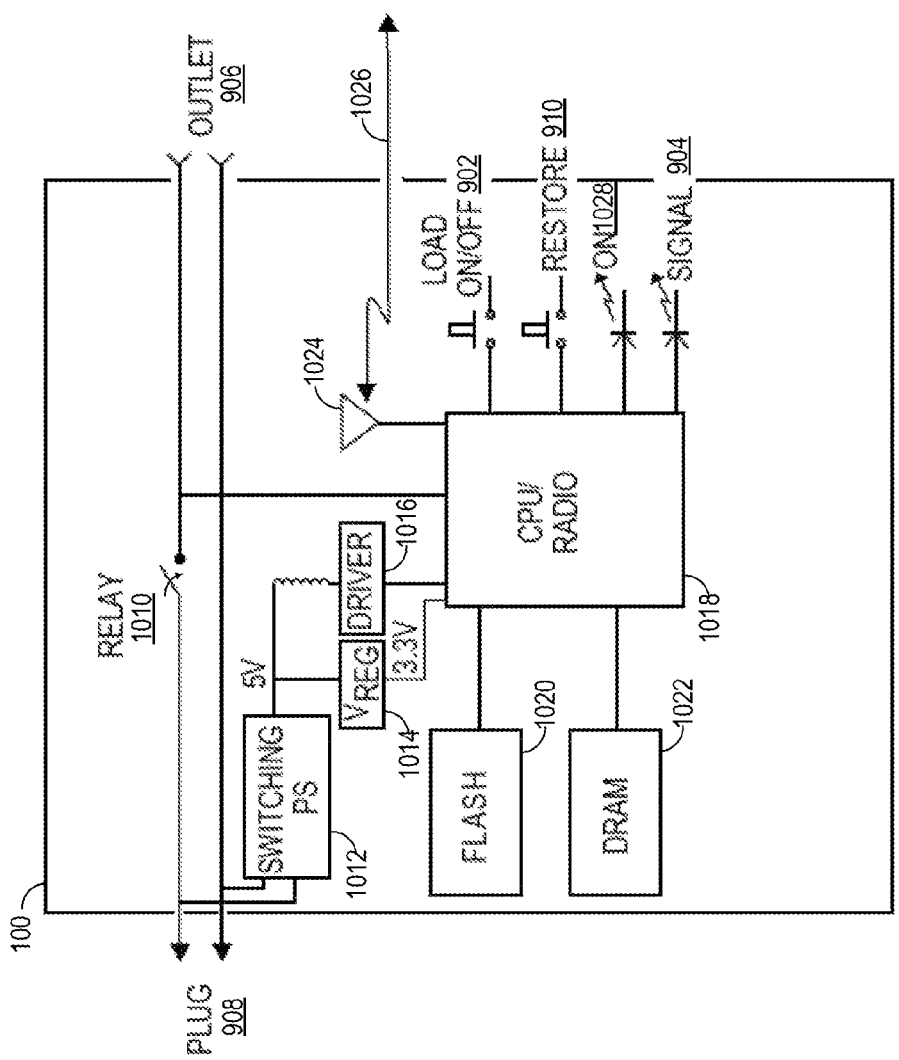
FIG. 10 is an example of a block diagram of a network device, in accordance with some embodiments.

FIG. 10 is an example of a block diagram of the network device 900 depicting different hardware and/or software components of the network device 900. As described above with respect to FIG. 9, the network device 900 includes the outlet 906, the plug 908, the power button 902, the restore button 910, and the communications signal indicator 904.

The network device 900 also includes light source 1028 associated with the power button 902. As previously described, the light source 1028 may be illuminated when the network device 900 is powered on.

The network device 900 further includes a relay 1010. The relay 1010 is a switch that controls whether power is relayed from the plug 908 to the outlet 906. The relay 1010 may be controlled either manually using the power button 902 or remotes using wireless communication signals. For example, when the power button 902 is in an ON position, the relay 1010 may be closed so that power is relayed from the plug 908 to the outlet 906. When the power button 902 is in an OFF position, the relay 1010 may be opened so that current is unable to flow from the plug 908 to the outlet 906. As another example, an application or program running on a mobile device may transmit a signal that causes the relay 1010 to be opened or closed. For instance, a mobile application may display a graphical interface on the mobile device that includes a power button. The user may tap or otherwise select the power button, and the mobile application may send a communication signal (e.g., over a WiFi network) to the network device 900 instructing the network device 900 to open or close the relay 1010.

The network device 900 further includes flash memory 1020 and dynamic random access memory (DRAM) 1022. The flash memory 1020 may be used to store instructions or code relating to an operating system, one or more applications, and any firmware. The flash memory 1020 may include nonvolatile memory so that any firmware or other program can be can updated. In the event the network device 900 loses power, information stored in the flash memory 1020 may be retained. The DRAM 1022 may store various other types of information needed to run the network device 900, such as all runtime instructions or code.

The network device 900 further includes a CPU/Radio 1018. The CPU/Radio 1018 controls the operations of the network device 900. For example, the CPU/Radio 1018 may execute various applications or programs stored in the flash memory 1020 and/or the dynamic random access memory (DRAM) 1022. The CPU/Radio 1018 may also receive input from the various hardware and software components, interpret the input, and perform one or more functions in response to the input. As one example, the CPU/Radio 1018 may determine whether the power button 902 has been pressed, and determines whether the relay 1010 needs to be opened or closed. The CPU/Radio 1018 may further perform all communications functions in order to allow the network device 900 to communicate with other network devices, one or more gateways, a cloud network, and/or one or more mobile devices. The network device 900 may communicate with other devices and/or networks via antenna 1024. For example, antenna 1024 may include a 2.4 GHz antenna that can transmit and receive WiFi communications signals. The antenna 1024 may include other types of antennas that can communicate Bluetooth® signals, Zigbee® signals, Ultra-Wideband (UWB) signals, and/or the like. In some embodiments, the network device 900 may include multiple antennas for communicating different types of communication signals.

The network device 900 further includes a driver 1016, a switching power supply 1012, and a voltage regulator 1014. The driver 1016 may include instructions or code that can be used to translate control signals or commands received from applications running on the DRAM 1022 to commands that the various hardware components in the network device 900 can understand. In some embodiments, the driver 1016 may include an ambient application running on the DRAM 1022.

The switching power supply 1012 may be used to transfer power from the outlet in which the plug 908 is connected to the various loads of the network device 900 (e.g., CPU/Radio 1018). The switching power supply 1012 may efficiently convert the voltage and current characteristics of the electrical power to a level that is appropriate for the components of the network device 900. For example, the switching power supply 1012 may perform AC-DC conversion. In some embodiments, the switching power supply 1012 may be used to control the power that is relayed from the plug 908 to the outlet 906. The voltage regulator 1014 may be used to convert the voltage output from the switching power supply 1012 to a lower voltage usable by the CPU/Radio 1018. For example, the voltage regulator 1014 may regulate the DC voltage from 5V to 3.3V.

In various embodiments, functions may be stored as one or more instructions or code in memory, such as the flash memory 1020 and/or the DRAM 1022. The network device 900 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above, for example as described with respect to FIGS. 2-5, may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the steps described above with respect to FIGS. 2-5. The memory, such as the flash memory 1020 and/or the DRAM 1022, may be a processor-readable memory and/or a computer-readable memory that stores software code (programming code, instructions, etc.) configured to cause a processor(s) within the CPU/Radio 1018 to perform the functions described. In other embodiments, one or more of the functions described may be performed in hardware.

A set of these instructions and/or code might be stored on a computer-readable storage medium, such as the flash memory 1020 and/or the DRAM 1022. In some cases, the storage medium might be incorporated within a computer system, such as the CPU/Radio 1018. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the network device 900 and/or might take the form of source and/or installable code, which, upon compilation and/or installation on the network device 900 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other mobile or computing devices such as network input/output devices may be employed.

It should be appreciated that the network device 900 may have other components than those depicted in FIGS. 9 and 10. Further, the embodiment shown in the figures are only one example of a network device that may incorporate an embodiment of the invention. In some other embodiments, network device 600 may have more or fewer components than shown in the figure, may combine two or more components, or may have a different configuration or arrangement of components.

Figure 11:
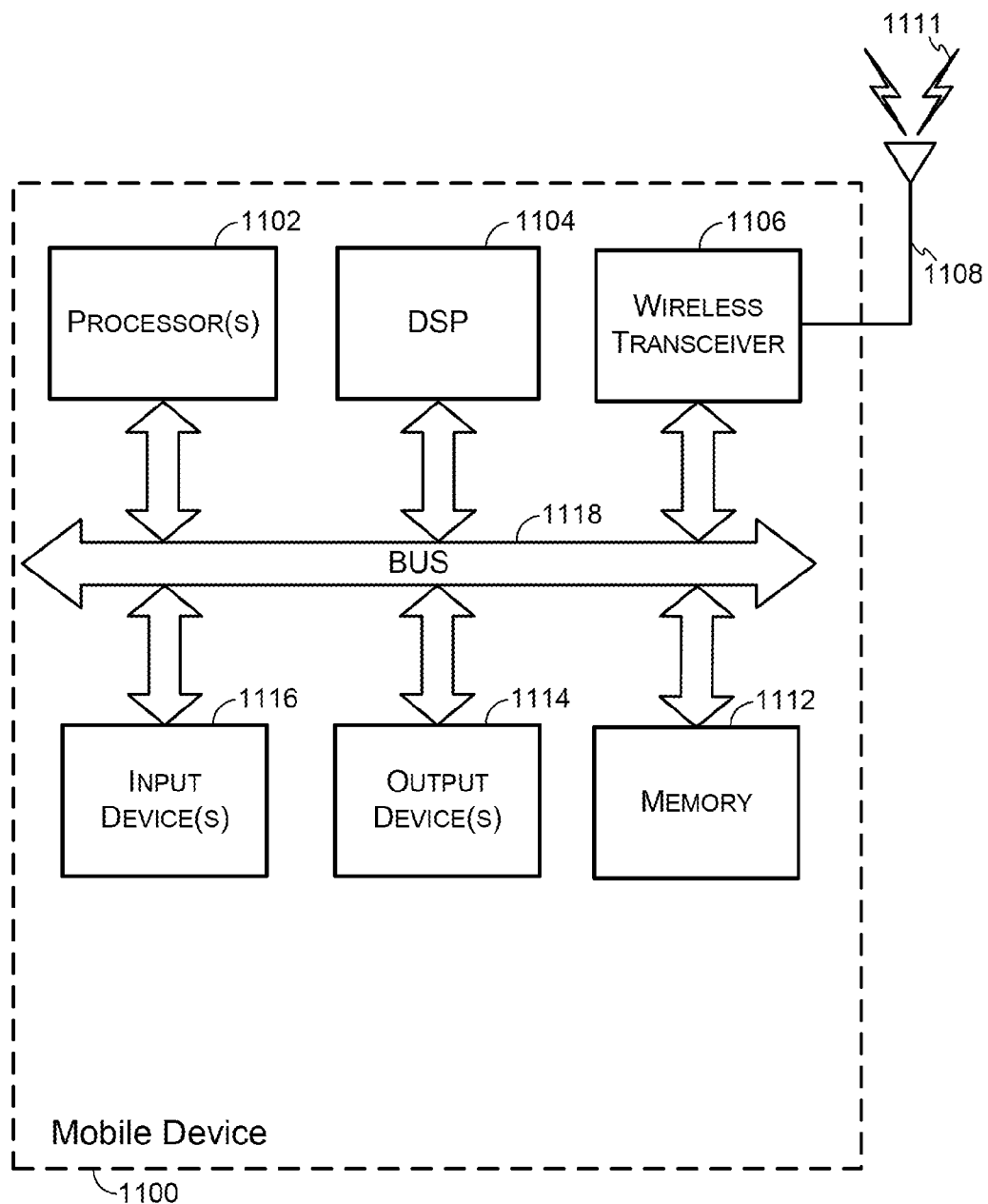
FIG. 11 is a block diagram illustrating an example of a mobile device, in accordance with some embodiments.

FIG. 11 illustrates an example of a mobile device 1100. The mobile device 1100 may be a cellular telephone, a smartphone, a laptop computer, a tablet, a personal digital assistant (PDA), a computing device, or any other mobile device having wireless connection capability. The mobile device 1100 includes hardware elements that can be electrically coupled via a bus 1118 (or may otherwise be in communication, as appropriate). In one embodiment, the bus 1118 can be used for the processor(s) 1102 to communicate between cores and/or with the memory 1112. Memory 1112 can be used to store cache 202 of the mobile device. The hardware elements may include one or more processors 1102, including without limitation one or more general-purpose processors and/or one or more special-purpose processors (such as digital signal processing chips, graphics acceleration processors, and/or the like); one or more input devices 1116, which can include without limitation a camera, a mouse, a keyboard, a touch sensitive screen, a touch pad, a keypad, and/or the like; and one or more output devices 1114, which can include, without limitation, a display, a printer, and/or the like.

The mobile device 1100 may include one or more wireless transceivers 1106 connected to the bus 1118. The wireless transceiver 1106 may be operable to receive a wireless signal 1110 via antenna 1108. The wireless signal 1110 may be transmitted via a wireless network. In some embodiments, the wireless network may be any wireless network such as a wireless local area network (e.g., local area network 110), such as WiFi, a Personal Access Network (PAN), such as Bluetooth® or Zigbee®, or a cellular network (e.g. a GSM, WCDMA, LTE, CDMA2000 network). Wireless transceiver 1106 may be configured to receive various radio frequency (RF) signals 1110 via antenna 1108 from one or more gateways, network devices, cloud networks, and/or the like. Mobile device 1100 may also be configured to decode and/or decrypt, via the DSP 1104 and/or processor(s) 1102, various signals received from one or more gateways, network devices, cloud networks, and/or the like.

The mobile device 1100 may further include (and/or be in communication with) one or more non-transitory storage devices (e.g., memory 1112), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more instructions or code in memory 1112, such as on a computer-readable storage medium, such as RAM, ROM, FLASH, or disc drive, and executed by processor(s) 1102 or DSP 1104. The mobile device 1100 can also comprise software elements (e.g., located within the memory 1112), including, for example, an operating system, device drivers, executable libraries, and/or other code, such as one or more application programs, which may comprise computer programs implementing various functions Memory 1112 may be a processor-readable memory and/or a computer-readable memory that stores software code (programming code, instructions, etc.) configured to cause the processor(s) 1102 and/or DSP 1104 to perform the various functions. In other embodiments, the various functions described may be performed in hardware.

Figure 12:
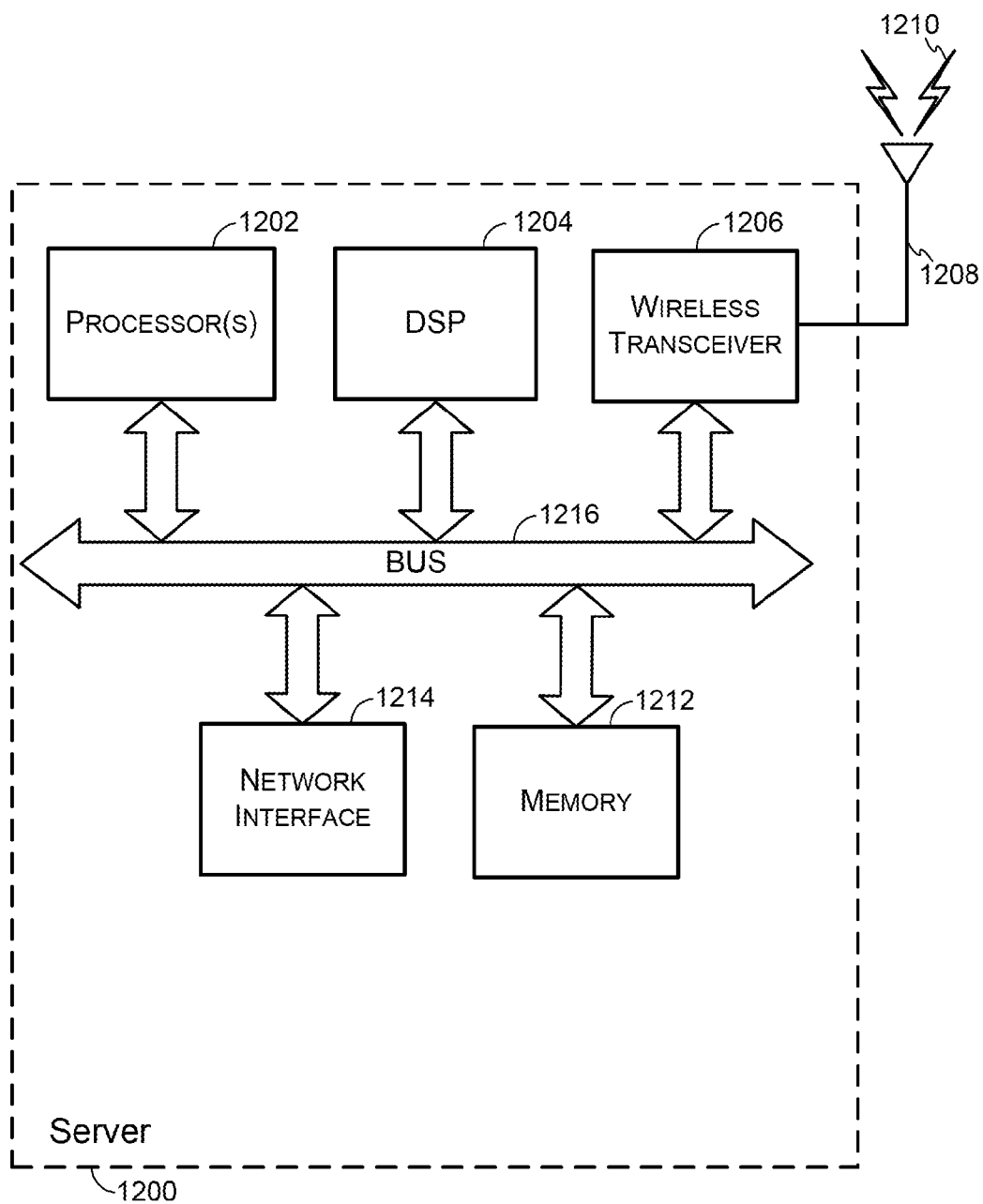
FIG. 12 is a block diagram illustrating an example of a server, in accordance with some embodiments.

FIG. 12 illustrates an example of a server 1200. The server 1200 includes hardware elements that can be electrically coupled via a bus 1216 (or may otherwise be in communication, as appropriate). In one embodiment, the bus 1216 can be used for the processor(s) 1202 to communicate between cores and/or with the memory 1212. The hardware elements may include one or more processors 1202, including, without limitation, one or more general-purpose processors and/or one or more special-purpose processors (such as digital signal processing chips, graphics acceleration processors, and/or the like), memory 1212, DSP 1204, a wireless transceiver 1206, a bus 1216, and antenna 1208. Furthermore, in addition to the wireless transceiver 1206, server 1200 can further include a network interface 1214 to communicate with a network (e.g., a local area network, a network of a preferred carrier, Internet, etc.).

The server 1200 may further include (and/or be in communication with) one or more non-transitory storage devices (e.g., memory 1212), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like. Memory 1212 can be used to store data store 204. For example, in an embodiment where data store 204 is implemented as a tile database, the tile database can be stored in memory 1212.

In various embodiments, functions may be stored as one or more instructions or code in memory 1212. The server 1200 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above, for example as described with respect to FIGS. 4-5, may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the steps described above with respect to FIGS. 4-5. The memory 1212 may be a processor-readable memory and/or a computer-readable memory that stores software code (programming code, instructions, etc.) configured to cause the processor(s) 1202 to perform the functions described. In other embodiments, one or more of the functions described may be performed in hardware.

A set of these instructions and/or code might be stored on a computer-readable storage medium, such as the memory 1212. In some cases, the storage medium might be incorporated within a computer system. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the server 1200 and/or might take the form of source and/or installable code, which, upon compilation and/or installation on the server 1200 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other mobile or computing devices such as network input/output devices may be employed.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative embodiments of the application have been described in detail herein, it is to be understood that the inventive concepts may be otherwise variously embodied and employed, and that the appended claims are intended to be construed to include such variations, except as limited by the prior art.

What is claimed is:

1. A computer-implemented method, comprising:
   receiving, at a computing device, communications including unique device identifiers for network devices connected to a network, wherein one of the network devices includes a function different from another one of the network devices;
   associating, by the computing device, a unique device identifier with each network device, wherein the unique device identifier is used to determine a customized interface module for the associated network device, wherein a customized interface module is associated with an interface element, and wherein a customized interface element is usable to control a specific function performable by a network device connected to a network; and
   transmitting, by the computing device, the customized interface modules, wherein when the customized interface modules are received by a single automation application on a mobile device, the customized interface modules are concurrently executable by the single automation application in a single interface of the single automation application that concurrently displays the customized interface elements on a display of the mobile device, and wherein the customized interface elements are usable to remotely control the specific functions performable by the network devices connected to the network.

2. The method of claim 1, wherein one or more of the customized interface elements correspond to one or more primary settings of the network devices.

3. The method of claim 2, wherein customized interface elements are configured to display a state of the network devices.

4. The method of claim 1, wherein a customized interface module defines a contextual menu for a network device, the contextual menu corresponding to a secondary setting of the network device, and wherein the secondary setting is associated with a primary setting of the network device.

5. The method of claim 1, wherein one of the customized interface elements is selectable to display a menu, the menu including one or more changeable settings of a network device.

6. The method of claim 1, wherein transmitting the customized interface modules includes transmitting the customized interface modules to a local area network gateway.

7. The method of claim 6, wherein the customized interface modules display customized interface elements using a single browser-based automation application.

8. The method of claim 1, further comprising:
   obtaining registration information for the network devices, wherein the network devices include one or more home automation network devices.

9. The method of claim 1, wherein receiving the customized interface modules at a mobile device facilitates monitoring and controlling the network devices, and wherein monitoring and controlling are enabled on the mobile device without receiving input corresponding to login credentials.

10. A system, comprising:
    a computing device including one or more data processors; and
    a non-transitory computer-readable storage medium containing instructions which when executed on the one or more data processors, cause the computing device to perform operations including:
    receiving communications including unique device identifiers for network devices connected to a network, wherein one of the network devices includes a function different from another one of the network devices;
    associating a unique device identifier with each network device, wherein the unique device identifier is used to determine a customized interface module for the associated network device, wherein a customized interface module is associated with an interface element, and wherein a customized interface element is usable to control a specific function performable by a network device connected to a network; and transmitting the customized interface modules, wherein when the customized interface modules are received by a single automation application on a mobile device, the customized interface modules are concurrently executable by the single automation application in a single interface of the single automation application that concurrently displays the customized interface elements on a display of the mobile device, and wherein the customized interface elements are usable to remotely control the specific functions performable by the network devices connected to the network.

11. The system of claim 10, the operations further comprising:

obtaining registration information for the network devices, the registration information including the unique device identifiers for the network devices;

using the registration information to register the network devices; and storing the interface modules in the computer-readable storage medium.

12. The system of claim 10, wherein the system is a cloud computing system, and wherein the instructions further comprise instructions, which when executed by the one or more data processors, cause the one or more processors to implement a cloud based service configured to provide a plurality of customized interface modules usable to monitor and control respective ones of a plurality of network devices, the cloud based service storing a unique module identifier for each of the plurality of customized interface modules.

13. The system of claim 10, wherein one or more of the customized interface elements correspond to one or more primary settings of the network devices, and wherein customized interface elements are configured to display a state of the network devices.

14. The system of claim 10, wherein a customized interface module defines a contextual menu for a network device, the contextual menu corresponding to a secondary setting of the network device, and wherein the secondary setting is associated with a primary setting of the network device.

15. The system of claim 10, wherein one of the customized interface elements is selectable to display a menu, the menu including one or more changeable settings of a network device.

16. The system of claim 10, wherein receiving the customized interface modules at a mobile device facilitates monitoring and controlling the network devices, and wherein monitoring and controlling are enabled on the mobile device without receiving input corresponding to login credentials.

17. A computer-program product tangibly embodied in a non-transitory machine-readable storage medium, including instructions configured to cause a data processing apparatus to:

receive communications including unique device identifiers for network devices connected to a network, wherein one of the network devices includes a function different from another one of the network devices;

associating a unique device identifier with each network device, wherein the unique device identifier is used to determine a customized interface module for the associated network device, wherein a customized interface module is associated with an interface element, and wherein a customized interface element is usable to control a specific function performable by a network device connected to a network; and transmit the customized interface modules, wherein when the customized interface modules are received by a single automation application on a mobile device, the customized interface modules are concurrently executable by the single automation application in a single interface of the single automation application that concurrently displays the customized interface elements on a display of the mobile device, and wherein the customized interface elements are usable to remotely control the specific functions performable by the network devices connected to the network.

18. The computer-program product of claim 17, wherein one or more of the customized interface elements correspond to one or more primary settings of the network device, and wherein customized interface elements are configured to display a state of the network devices.

19. The computer-program product of claim 17, wherein an customized interface module defines a contextual menu for a network device, the contextual menu corresponding to a secondary setting of the network device, and wherein the secondary setting is associated with a primary setting of the network device.

20. The computer-program product of claim 17, wherein one or more of the customized interface elements correspond to one or more primary settings associated with at least one specific function performable by the one of the network devices, and wherein the at least one specific function is different from functions performable by another one of the network devices.

21. The computer-program product of claim 17, wherein customized interface elements are configured to display a state of the network devices.

22. The computer-program product of claim 17, wherein one of the customized interface elements is selectable to display a menu, the menu including one or more changeable settings of a network device.

23. The computer-program product of claim 17, wherein receiving the customized interface modules at a mobile device facilitates monitoring and controlling the network devices, and wherein monitoring and controlling are enabled on the mobile device without receiving input corresponding to login credentials.

* * * * *